US007481937B2

(12) United States Patent
Rice et al.

(10) Patent No.: US 7,481,937 B2
(45) Date of Patent: Jan. 27, 2009

(54) METHODS AND SYSTEMS FOR TREATING WASTEWATER USING OZONE ACTIVATED FLOTATION

(75) Inventors: David Brian Rice, San Isidro de General (CR); Paul Milton Clift, San Isidro de General (CR)

(73) Assignee: Heavy Industry Technology Solutions, LLC, New York, NY (US)

( * ) Notice: Subject to any disclaimer, the term of this patent is extended or adjusted under 35 U.S.C. 154(b) by 398 days.

(21) Appl. No.: 11/039,287

(22) Filed: Jan. 19, 2005

(65) Prior Publication Data

US 2006/0157424 A1    Jul. 20, 2006

(51) Int. Cl.
*C02F 1/24* (2006.01)
*C02F 1/78* (2006.01)

(52) U.S. Cl. .............. 210/703; 210/760; 210/718; 210/750; 210/706; 554/8; 554/156

(58) Field of Classification Search ........... 210/703, 210/760, 750, 706, 718; 554/8, 156
See application file for complete search history.

(56) References Cited

U.S. PATENT DOCUMENTS

| 2,360,812 | A |   | 10/1944 | Kelly et al. |
| 2,772,234 | A |   | 11/1956 | Kelly |
| 3,523,891 | A | * | 8/1970 | Mehl ................... 210/707 |
| 3,628,010 | A |   | 12/1971 | Tarkoey |
| 3,659,096 | A |   | 4/1972 | Kompanek |
| 3,825,494 | A | * | 7/1974 | Call et al. ............ 210/138 |
| 3,884,803 | A | * | 5/1975 | Traylor ................ 210/704 |
| 3,914,173 | A |   | 10/1975 | Call et al. |
| 4,053,399 | A | * | 10/1977 | Donnelly et al. ....... 210/706 |
| 4,061,568 | A | * | 12/1977 | Hall ................... 210/705 |
| 4,193,869 | A |   | 3/1980 | Brucker et al. |
| 4,265,747 | A |   | 5/1981 | Copa et al. |
| 4,274,970 | A |   | 6/1981 | Beitzel |
| 4,555,345 | A | * | 11/1985 | Yoshida ............... 210/705 |
| 4,737,272 | A | * | 4/1988 | Szatkowski et al. ..... 209/164 |
| 4,889,701 | A | * | 12/1989 | Jones et al. ........... 423/220 |
| 4,978,508 | A |   | 12/1990 | Hansen et al. |
| 5,178,755 | A | * | 1/1993 | LaCrosse ............ 210/195.1 |
| 5,180,499 | A | * | 1/1993 | Hinson et al. ......... 210/706 |
| 5,240,600 | A |   | 8/1993 | Wang et al. |
| 5,433,866 | A | * | 7/1995 | Hoppe et al. .......... 210/748 |
| 5,494,576 | A |   | 2/1996 | Hoppe et al. |
| 5,879,732 | A |   | 3/1999 | Caracciolo, Jr. et al. |

(Continued)

FOREIGN PATENT DOCUMENTS

EP    0261822    3/1988

(Continued)

*Primary Examiner*—Thomas M Lithgow
(74) *Attorney, Agent, or Firm*—Perkins Coie LLP

(57) ABSTRACT

Various methods and systems are provided below for the treatment of wastewater. According to various embodiments, treatment of wastewater is accomplished using the oxidative power of ozone gas and the interaction between ozone gas, FOGS, and large amounts of surfactants already present in wastewaters to be treated. According to various embodiments of the invention, a combination of oxidation and UV disinfection is used to provide a fact acting treatment for wastewater. These methods and systems generally enable reduced footprint in relation to the volumes treated, reduced cost, and increased efficiency. Various alternative embodiments are also disclosed.

18 Claims, 17 Drawing Sheets

U.S. PATENT DOCUMENTS

| | | |
|---|---|---|
| 6,649,052 B2 | 11/2003 | Lee et al. |
| 6,835,560 B2 | 12/2004 | Greene |
| 2002/0113012 A1 | 8/2002 | Hoffland |
| 2002/0117458 A1* | 8/2002 | Puetter et al. ............... 210/760 |
| 2003/0075502 A1 | 4/2003 | Mullerheim |
| 2004/0094848 A1* | 5/2004 | Lange ......................... 261/59 |

FOREIGN PATENT DOCUMENTS

| | | | |
|---|---|---|---|
| GB | 2279946 A | * | 1/1995 |
| JP | 05-007799 A | * | 1/1903 |
| JP | 10-305762 A | * | 11/1998 |
| JP | 11-057690 A | * | 3/1999 |
| JP | 2001-009446 | | 1/2001 |
| RU | 2057087 | | 3/1996 |
| SU | 1030317 A | * | 7/1983 |
| SU | 1114618 | | 9/1984 |
| WO | WO 94/11307 | | 5/1994 |
| WO | 97/29997 A1 | * | 8/1997 |
| WO | 02/096808 A1 | * | 12/2002 |

* cited by examiner

METHODS AND SYSTEMS FOR TREATING WASTEWATER USING OZONE ACTIVATED FLOTATION

RELATED APPLICATION

U.S. patent application Ser. No. 11/039,315, titled "Methods and Systems For Treating Wastewater Using Ultraviolet Light," has been filed on Jan. 19, 2005 for David Rice and Paul Clift. This application, which is assigned to the assignee of the present application, is relevant to the subject matter of the present application, and is incorporated herein by reference in its entirety.

FIELD OF THE INVENTION

The present invention relates to the field of wastewater treatment. More particularly, this invention relates to the treatment of wastewater using the oxidative power of ozone gas.

BACKGROUND OF THE INVENTION

In many countries and locations, it is a common practice to discharge untreated wastewater directly back into the environment. Often, this is due to a lack of funding. However, spatial restrictions, especially for coastal towns where the installation of large treatment facilities is not an option, also play a large role when there is an inability (or lack of willingness) to provide wastewater with proper treatment prior to discharge into the environment.

Even when there exists some form of treatment of wastewater, this treatment is often inadequate and/or inefficient. For example, oxidation ponds, which are in common use in developing countries, normally have an undesirably large retention time of approximately seven to eight days. Moreover, oxidation ponds generally require energy consumptive and inefficient aeration practices, and require prohibitively large areas to be effective. In addition, with oxidation ponds, not only does a significant amount of the present soaps remain in the treatment wastewater, but the discharge from these ponds also generally includes very high levels of suspended solids, bacteria concentrations, and non-polar, insoluble substances such as fats, oils, and greases (FOGs). It will be understood that, as used herein, grease refers to a long-chain hydrocarbon molecule, which is made up of hydrogen and carbon. The terms fats and oils, as used herein, also refer to molecules made up of hydrocarbons.

Flotation technologies also are currently used in a variety of wastewater applications, where coagulants and flocculants are added to the wastewater being treated to assist the flotation of the desired components to be removed. In general, once the components to be removed have risen to the surface of the wastewater being treated, they are skimmed off (removed from) the wastewater and disposed of in an appropriate manner. As is the case with oxidation ponds, however, these flotation technologies have several disadvantages, due to the requirement that coagulants and flocculants be added and for other reasons as well. For example, such flotation technologies often include complex systems that require a high level of maintenance, and often also require high pressures and constant monitoring by experienced individuals.

Ultraviolet (UV) light, which can act as a disinfectant in water due to the fact that radiation in high doses can permanently damage the cellular structure of bacteria and viruses, has also been used to treat wastewater. For example, several treatments include UV lights submerged in a tank containing the wastewater to be treated. In some of these treatments, ozone, which is also commonly used as a disinfectant in water because it is a powerful oxidant, is bubbled up through the bottom of the tank through the wastewater. The effectiveness of methods using UV lights has been limited, however, due to the limited interaction between the wastewater and the UV lights. For example, UV penetration of the wastewater (and interaction with ozone, when it is being used) is often decreased because the exteriors of the UV lights being used are subject to fouling by the contaminants contained in the wastewater. Additionally, for example, wastewaters with high levels of turbidity and suspended solids, and high color values, inhibit UV transmittance, thereby reducing the effectiveness assocaited with the use of UV lights in past treatment systems.

Accordingly, it is desirable to provide methods and systems for the treatment of wastewater that alleviate several of the problems associated with existing treatments. It is also desirable to provide methods and systems for improved treatment of wastewater.

SUMMARY

Various methods and systems are provided below for the treatment of wastewater. According to some of the various embodiments of the invention, the methods and systems use the oxidative power of ozone gas together with the interaction between ozone gas, FOGS, and large amounts of surfactants generally present in municipal wastewaters to achieve a fast acting treatment for these waters. Moreover, according to some of the various embodiments of the invention, a combination of oxidation and UV disinfection is used to provide a fast acting treatment for wastewater. Such methods and systems generally enable reduced footprint in relation to the volumes treated, reduced cost, and increased efficiency.

In at least one embodiment, the invention provides a method for treating wastewater, where the method includes receiving the wastewater to be treated, adding ozone into the wastewater, agitating the wastewater to facilitate the formation of foam, and removing at least some of the foam from the wastewater.

According to at least one other embodiment, the invention provides a system for treating wastewater, where the system includes an induction nozzle for entraining ozone into the wastewater and a mixing blade for agitating the wastewater, wherein agitating the wastewater results in the formation of foam, and a foam removing component removes at least some of the foam from the wastewater.

According to at least one other embodiment, the invention provides a system for treating wastewater, where the system includes means for receiving the wastewater to be treated, means for adding ozone into the wastewater, means for agitating the wastewater to facilitate the formation of foam, and means for removing at least some of the foam from the wastewater.

BRIEF DESCRIPTION OF THE DRAWINGS

Additional embodiments of the invention, its nature and various advantages, will be more apparent upon consideration of the following detailed description, taken in conjunction with the accompanying drawings, in which like reference characters refer to like parts throughout, and in which.

DETAILED DESCRIPTION OF THE PREFERRED EMBODIMENTS

According to the principles of the present invention, methods and systems are provided for the treatment of wastewater that alleviate several problems associated with existing treatments and improve the quality and efficiency of the treatment. It will be understood that certain features that are well known in the art are not described in great detail in order to avoid complication of the subject matter of the present invention.

Figure 1A:
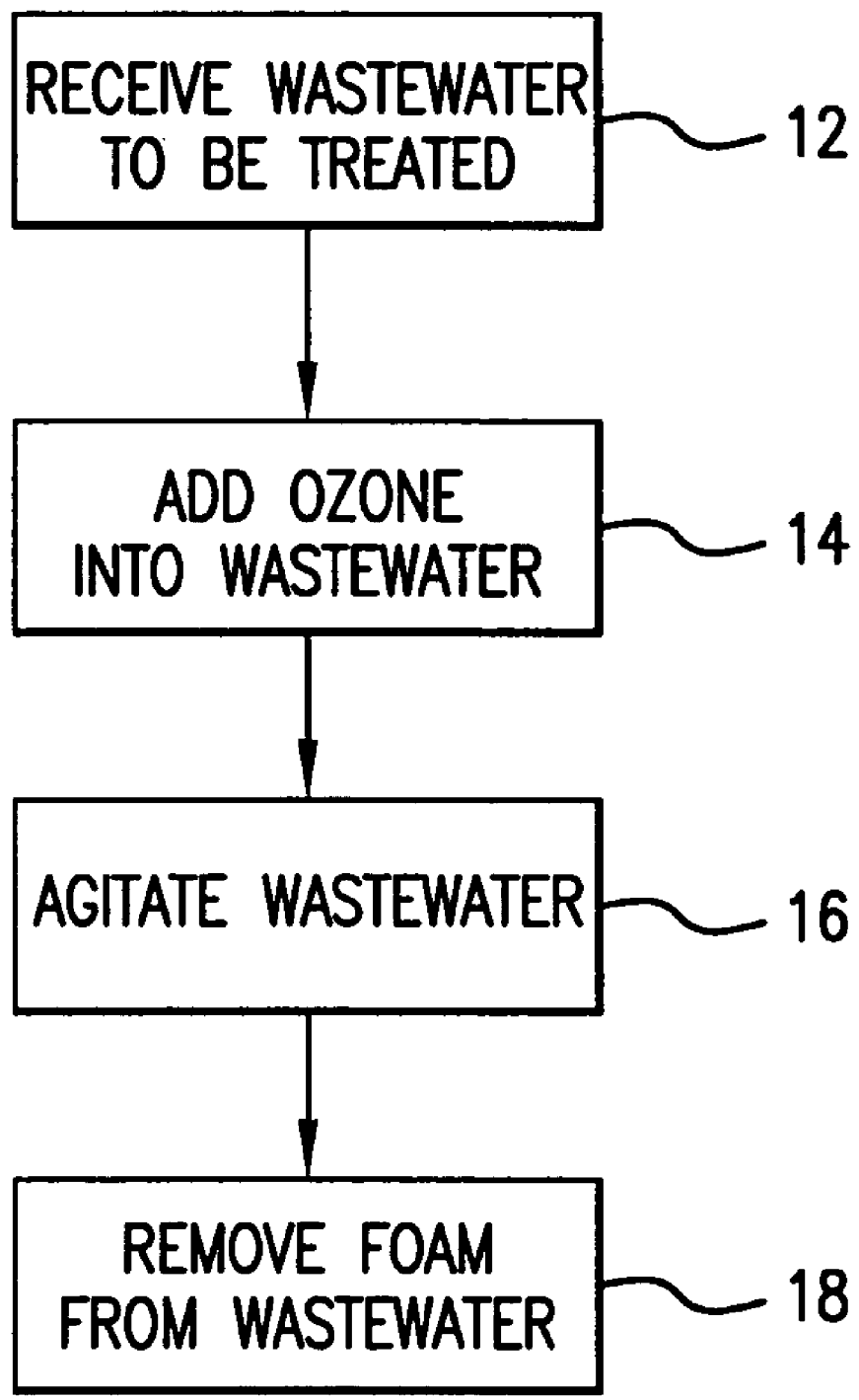
FIG. 1A is a simplified flow diagram illustrating steps performed in the treatment of wastewater according to at least one embodiment of the present invention.

FIG. 1A is a simplified flow diagram illustrating steps performed in the treatment of wastewater according to at least one embodiment of the present invention, as described in greater detail below with reference to several wastewater treatment system illustrations. At step 12, wastewater to be treated is first received. For example, as explained in greater detail below, this wastewater may be received from a natural pond, a man-made reservoir, or any other suitable source of wastewater. Next, at step 14, ozone (and optionally ambient air) is added into the wastewater. For example, ozone may be entrained into the wastewater, where the motive force of high velocity wastewater is used to create a partial vacuum that draws ozone into the wastewater, and where the combination is compressed to create a substantially uniform gas/liquid mixture. As explained below, ozone may be entrained into wastewater in this manner using, for example, a VENTURI nozzle. Moreover, as explained in greater detail below, the oxidation that occurs as a result of adding ozone into the wastewater helps to purify the wastewater because ozone is a powerful oxidant. At step 16, after the addition of ozone (and optionally, ambient air) to the wastewater, the wastewater is agitated to facilitate the production of foam. This agitation may be achieved, for example, using a rotating mixing blade. Additional agitation may also be achieved by first passing the wastewater through an aeration tower. Both of these methods of agitation are described in greater detail below. Finally, at step 18, the produced foam (and whatever solids, etc. that have collected in the foam, as explained below) is separated from the wastewater, leaving behind the treated wastewater.

Figure 1B:
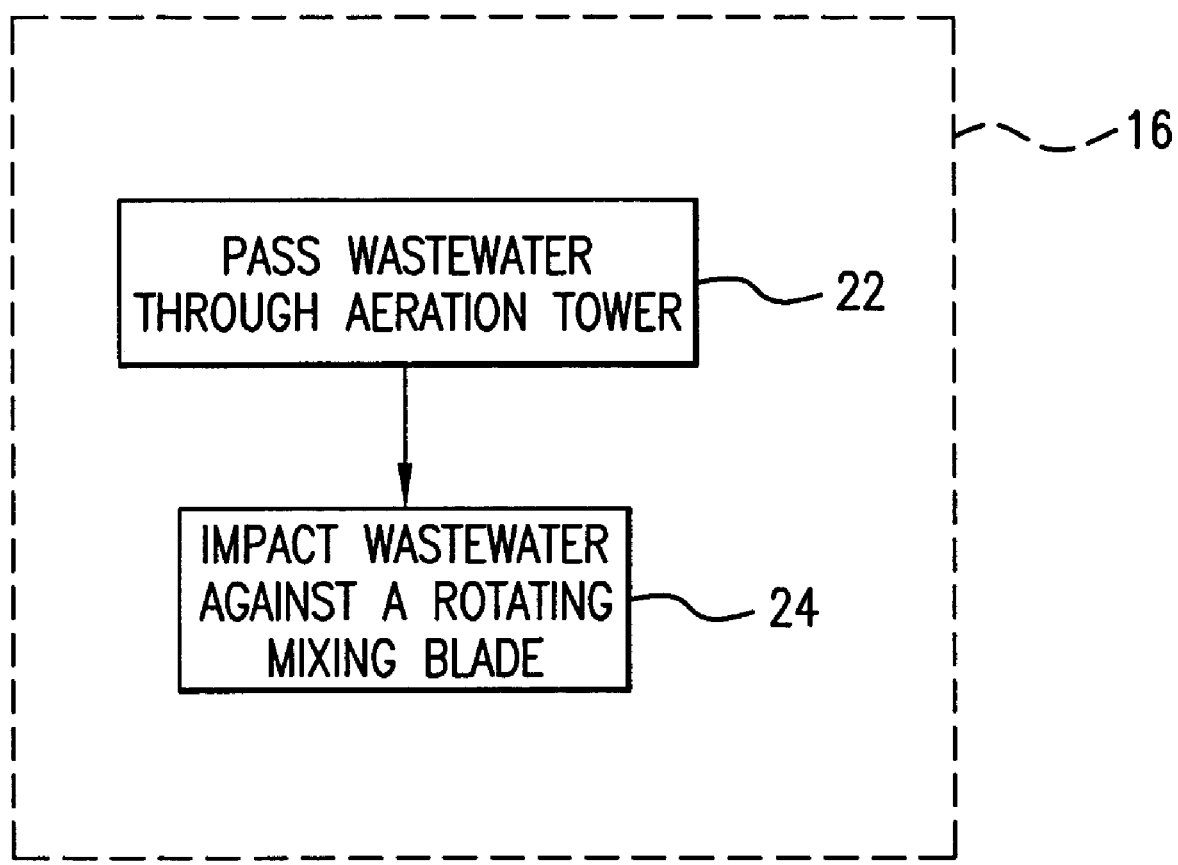
FIG. 1B is a more detailed, but still simplified, flow diagram of a step depicted in FIG. 1A according to at least one embodiment of the present invention.

FIG. 1B is a more detailed, but still simplified, flow diagram of step 16 depicted in FIG. 1A according to at least one embodiment of the present invention. Referring to FIG. 1B, agitating wastewater during its treatment process (step 16, FIG. 1A) may include the following steps. First, at step 22, the wastewater may be passed through an aeration tower. As explained in greater detail below, the use of an aeration tower results in a reduction of chemical oxygen demand (COD) and biological oxygen demand (BOD) in the wastewater being treated. Next, at step 24, the wastewater exits the aeration tower and is impacted against a rotating mixing blade. Using these steps, the wastewater is sufficiently agitated to bring about the production of foam (which can be separated from the wastewater, as explained below).

Figure 1C:
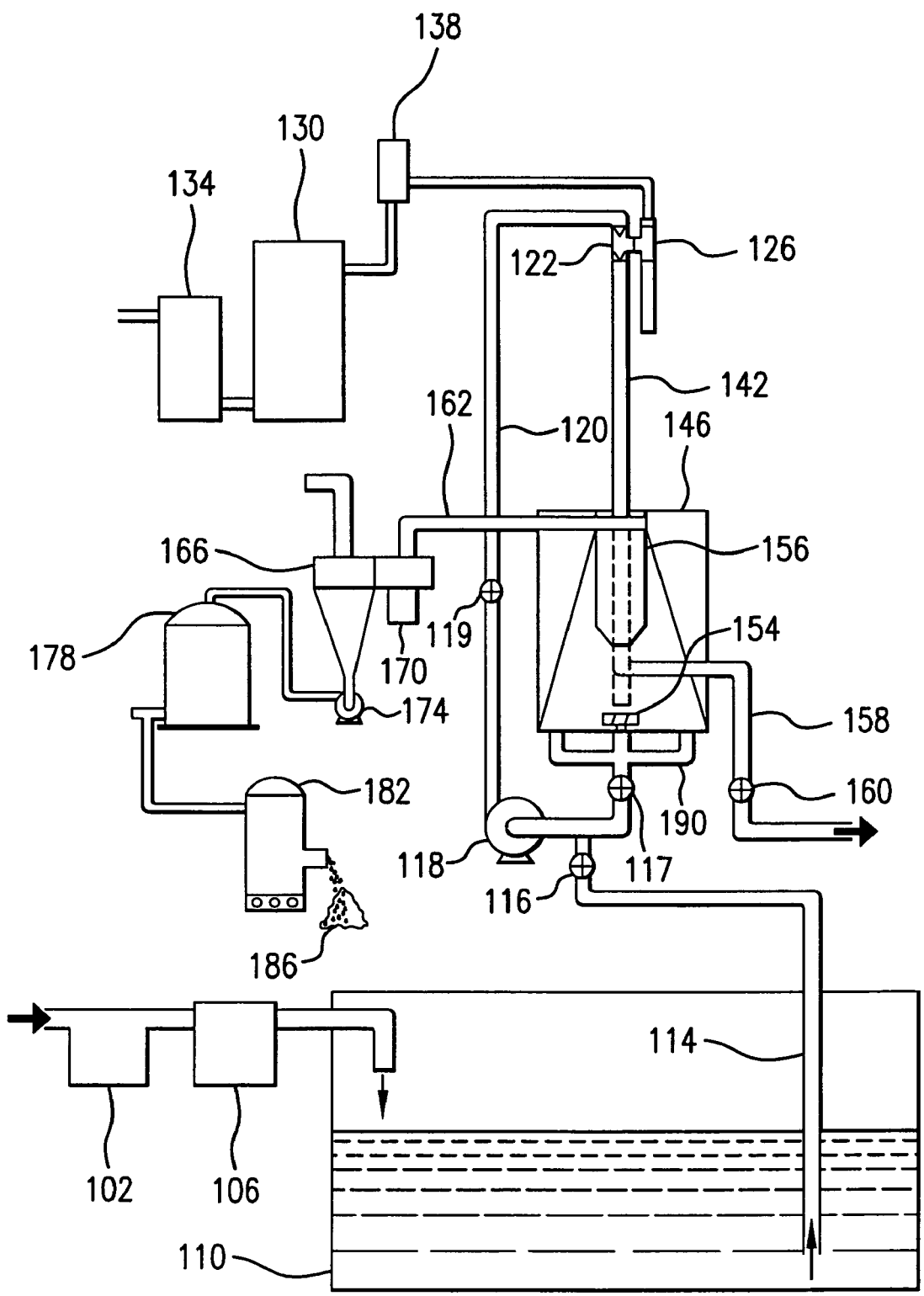
FIG. 1C is a simplified illustration showing a system that includes a flotation tank for treating wastewater according to at least one embodiment of the present invention.

The steps shown in the flow diagrams of FIGS. 1A and 1B (and other steps) will be better understood upon consideration of the following description of a system for treating wastewater as illustrated in FIG. 1C, which is now explained in detail.

FIG. 1C is a simplified diagram of a system for treating wastewater according to at least one embodiment of the present invention. It will be understood that, as used herein, the term wastewater refers generally to any type of water that contains unwanted materials, for example, from homes, businesses, and/or industries. Moreover, while different levels of treatment may be required for different types of wastewater (e.g., for municipal wastewater versus industrial wastewater), it will be understood that the invention is not limited in this manner, and that modifications can be made to accommodate these different requirements without departing from the scope or spirit of the present invention.

According to various embodiments, as shown in FIG. 1C, raw or untreated wastewater to be treated first passes through equipment 102 for delivering a homogenous (and thus more treatable) mixture of wastewater to a receiving tank, or reservoir 110. Equipment 102 can be, for example, a dual barrel grinder (such as those produced manufactured by JWC ENGINEERING and FRANKLIN MILLER), a solids separator, or any other suitable device that is capable of reducing solids to a uniform size. According to various embodiments, the solids are reduced by the grinder to window screen size particles (approximately 0.5 mm in diameter). In general, equipment 102 also includes a perforated, inclined auger tray, or any similar device that screens, washes, dewaters, and carries away the remaining solid matter larger than, for example, 0.2-0.5 mm in diameter for on-site or off-site disposal.

After passing through equipment 102, according to various embodiments, wastewater to be treated is delivered to grit removal trap 106. Used together with equipment 102, grit removal trap 106 may be used to make the wastewater effluent manageable and consistent before entering the next phase of treatment. For example, grit removal trap 106 may be a PISTA or JETTA grit trap using a mechanized vortex flow container that removes grit from the wastewater inflow. Moreover, grit removal trap 106 is generally emptied periodically, for example, every two weeks. It should be noted, however, that the invention is not limited by the type of grit trap being used, or the frequency with which it is emptied.

The remaining wastewater is directed into an equalization tank, a pond, or a man-made reservoir 110 designed to act as a surge tank. According to various embodiments, reservoir 110 has the capacity to handle the equivalent of between 4-12 hours of influent flow, depending on the desired hours of operation of the plant. However, a reservoir with larger or smaller capacity can also be used in certain situations. It should also be noted that, although the embodiment shown in FIG. 1C includes the use of grit removal trap 102 and equipment 106 before untreated wastewater is emptied into reservoir 110, this is not required. For example, according to various embodiments of the invention, a grit removal trap and equipment similar to grit removal trap 102 and equipment 106 may be incorporated into reservoir 110. Alternatively, for example, such a grit removal trap and equipment can be used after wastewater is removed from reservoir 110, but before it is passed to the remainder of the treatment system shown in FIG. 1C. The invention is not limited in this manner.

Untreated wastewater in reservoir 110 is drawn through suction line 114 (assuming flow-regulating valve 116 is not closed) using pressure pump 118. Generally, the flow rate through suction line 114 is at least equal to the flow rate of the influent into the system. For example, when the flow rate of pressure pump 118 is set equal to the rate of influent flow, the treatment system will be in operation throughout the day. However, by increasing the flow rate of pressure pump 118, the treatment system can be set to operate only a specific number of hours per day (i.e., less than 24 hours per day). It will be understood that pressure pump 118 and the other pumps described below may be any suitable type of pressure pump, such as those manufactured by Goulds Pumps of ITT Industries, Inc.

Pressure pump 118 and the other pumps described below will generally be capable of handling 20-80 psi of liquid pressure, where the pressure for pump 118 is controlled by valves 116 and 117, the latter of which is described in greater detail below. While the valves described herein and shown in the figures are also able to control flow rate, it is generally the induction nozzles (e.g., induction nozzle 122) that are used for this purpose.

When valve 119 is not closed, the wastewater drawn from reservoir 110 using pressure pump 118 is delivered through line 120 to induction nozzle 122. Induction nozzle 122 is used to entrain a combination of ozone gas and ambient air ("ozone/air") into the stream of wastewater to be treated with an efficiency of, for example, 70% or greater. According to various embodiments of the present invention, induction nozzle 122 (and/or one or more of the other nozzles described below) is a VENTURI nozzle that functions as will now be explained with reference to FIG. 1D. The invention is not, however, limited in this manner. For example, induction nozzle 122 (and/or one or more of the other nozzles) may be an injector or eductor as currently manufactured by Mazzei Injector Corp. or Vortex Ventures Inc.

Figure 1D:
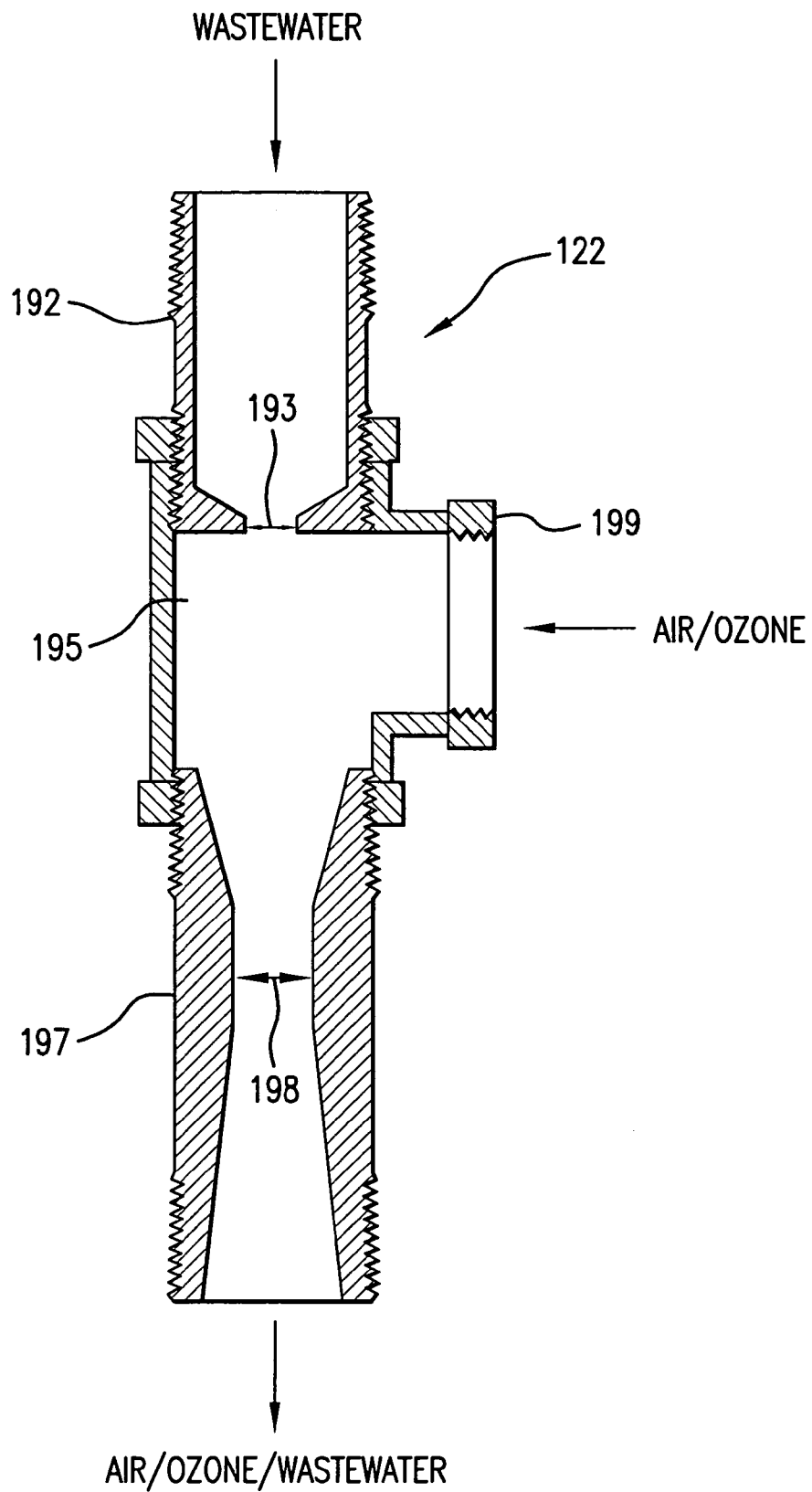
FIG. 1D is a more detailed, but still simplified illustration showing an induction nozzle that may be used in the system shown in FIG. 1C according to at least one embodiment of the present invention.

As shown in FIG. 1D, when induction nozzle 122 is a VENTURI nozzle, it generally includes a drive nozzle or tube 192 with a drive tube discharge orifice 193, a mixing portion 195, and a VENTURI nozzle or tube 197 with a VENTURI tube orifice or throat 198. Moreover, as shown in FIG. 1D, mixing portion 195 is part of a VENTURI tee or mixing body 199. The motive force of the high velocity liquid wastewater passing through induction nozzle 122 is used to create a partial vacuum in mixing portion 195, whereby ozone/air is drawn into the wastewater. The wastewater and ozone/gas are then recompressed in the VENTURI tube 197, creating a substantially uniform gas/liquid mixture on the discharge end. According to various embodiments, induction nozzle 122 has an operating liquid pressure of 40-160 psi, and is used to entrain ozone into the wastewater at a rate of 10-20 mg/l of wastewater flow. Depending on the application, however, induction nozzle 122 may also be used to entrain ozone into wastewater at other rates (i.e., less than 10 mg/l, or greater than 20 mg/l).

With induction nozzle 122, the diameter of the drive tube discharge orifice 193 determines the flow rate of the wastewater, and can range from, for example, 1/16 of an inch to ten feet or larger depending on the desired flow. In general, induction nozzle 122 is designed to be able to handle at least the amount of flow coming from reservoir 110, and in cases where treated wastewater is being recycled (as explained below), it is designed to handle more (e.g., several times more) than this amount of flow. Moreover, while commercially available induction nozzles may be used, according to various embodiments, a custom made induction nozzle 122 is used, where the diameter of the VENTURI tube orifice or throat 198 is 1.4-1.8 (e.g., approximately 1.618) times larger than the diameter of the drive tube discharge orifice 193.

Referring back to FIG. 1C, ozone and air to be added (e.g., entrained) into the wastewater is delivered to induction nozzle 122 through a dual induction port 126. Although not required, as shown in FIG. 1C, the ozone can be electrically produced on-site by ozone generator 130 (which is provided with feed gas from oxygen concentrator 134). According to various embodiments of the invention, ozone generator 130 produces ozone gas in concentrations of up to approximately 6-7% when simply using air as the feed gas (the remaining percentage of the gas that is supplied to induction port 126 from ozone generator 130 being air), and up to approximately 12% when supplied with, for example, a 98% pure oxygen feed gas from oxygen concentrator 134 (with approximately 88% of the gas that is supplied to induction port 126 from ozone generator 130 being pure oxygen). Using air as the feed gas for ozone generator 130, the dissolved oxygen (DO) level of the treated wastewater is commonly around 7-9 parts per million (ppm). On the other hand, using pure oxygen as the feed gas for ozone generator 130, the DO level of the treated wastewater is commonly around 30 ppm (which is more desirable when discharging into the environment or using biologically active carbon filtration at the end of the treatment process). Moreover, while ozone produced by ozone generator 130 is provided to induction port 126 using ozone distribution manifold 138 in FIG. 1C, the invention is not limited in this manner. For example, instead of using manifold 138 as shown, ozone can be directly delivered to induction port 126 from ozone generator 130.

At the discharge end of induction nozzle 122, ozone/air infused wastewater is received at the top of vertical aeration tower 142 (the height of which may be, e.g., 1.25-1.5 times the depth of flotation cell or tank 146, which is described below). Inside aeration tower 142, which may be made from, for example, polyvinyl chloride (PVC) plastic, a counter-current flow between very small air bubbles and the mixture of ozone/air infused wastewater is established due to back pressure dictated by the height of the water column inside flotation tank 146. As explained below and shown in greater detail in FIG. 2, flotation tank 146 is where a substantial portion of the wastewater treatment takes place. According to various embodiments, the back pressure found inside aeration tower 142 is also increased through the use of a flow restrictor (not shown) that is located at the discharge end of aeration tower 142. The flow restrictor may also be, for example, a piece of PVC plastic (e.g., a PVC cap) that is fitted to the discharge end of aeration tower 142, where the PVC piece includes a hole that allows wastewater to pass with a resistance as determined by the size of the hole. The hole in the PVC piece may be present at the time of manufacture, or, for example, may be drilled into the PVC piece before being placed at the discharge end of aeration tower 142. It should be noted that, while the PVC piece is used to create above ambient pressures in aeration tower 142, the resulting back pressure should not be so great as to back flow the discharge end of induction nozzle 122.

The counter-current flow of air bubbles inside aeration tower 142 helps to increase the interaction between the wastewater being treated and the added ozone. Thus, among other things, the use of aeration tower 142 results in a further reduction of COD and BOD in the wastewater being treated (for example, ozone helps convert non-biodegradable COD to a more biodegradable and easier to treat state, and can oxidize many volatile organic compounds (VOCs)), helping to produce a wastewater stream that comes closer to meeting accepted discharge standards. This reduction in both the COD and BOD is important to prevent (or at least reduce) the de-oxygenation of the receiving body of water once the wastewater is discharged, for example, back into the environment.

The oxidation that occurs after ozone is added into the wastewater also helps to purify the wastewater by converting many organic impurities to more water-soluble forms. For example, ozone can be used in this manner to oxidize organic compounds having a double bond, including those having a benzenoid moiety, to aldehydes, ketones, or carboxylic acids, and to react with alcohols to form carboxylic acids. Ozone is also able to oxidize inorganics such as iron manganese, cyanides, sulfides, nitrites, pesticides, dioxins, and heavy metals. In addition, ozone can help disinfect the wastewater by killing waterborne pathogens. Moreover, while ozone reacts much faster and thus requires less contact time than is the case with, for example, chlorine, ozone treatment produces no harmful or carcinogenic by-products. Additionally, ozone is effective in removing undesirable color and odor in wastewaters, and assists in the formation of microfloc, flocculation and precipitation which can more easily be removed from the wastewater in the manner described further below.

As shown in FIG. 1C, the ozone/air saturated wastewater is discharged from the open end of tower 142 through an orifice restriction, or discharge nozzle (not shown) into the lower region of flotation tank 146. According to various embodiments, the discharge nozzle is capable of producing water droplets in the range of 200-440 micrometers, although droplets outside this range are also contemplated.

Towards the bottom of flotation tank 146, directly beneath the discharge point of aeration tower 142, is an agitating or down drafting mixing blade 154. According to various embodiments, mixing blade 154 includes four bladed units pitched to approximately a 45° angle. That is, for any or all of the bladed units that make up mixing blade 154, the leading edge of the pitched bladed units would be angled up approximately 22.5°, and the trailing edge would be angled down approximately 22.5° in order to create a downdraft effect. It should be noted that other angles are also contemplated in accordance with the invention. In general, the downdraft effect on the wastewater created by the configuration of the bladed units of mixing blade 154 helps to disperse the wastewater in an umbrella pattern throughout the tank (as explained below). Perforated blades and rough-edged blades may also be used.

Although not shown in FIG. 1C, mixing blade 154 is attached to a motor that is responsible for rotating it. According to various embodiments, this motor is capable of rotating the blade 154 at 750-3600 rpm. It should be noted, however, that the speed at which mixing blade 154 rotates will generaly depend on the size of flotation tank 146. In particular, as the size of flotation tank 146 increases, a faster spinning mixing blade 154 will generally be required to adequately distribute the wastewater to the outer regions of flotation tank 146. Mixing blade 154 is designed to siphon the wastewater down through its draft, reducing the size of the exiting bubbles in solution, and dispersing them in a uniform, umbrella-like pattern in flotation tank 146. In other words, mixing blade 154 creates a shearing effect on the ozone/air infused wastestream, impacting it and dispersing fine bubbles throughout the tank chamber.

The action of this below surface agitator (i.e., mixing blade 154) helps to increase the interaction between the wastestream and ozone, and to agitate the wastewater so as to generate a thick layer of soap suds or foam in flotation tank 146 from surfactants (soaps) present in the waste stream. It should be noted that mixing blade 154 is not required for the production of soap suds or foam, and thus, according to various embodiments, mixing blade 154 will not be used (and may possibly be absent from the system). However, it should also be noted that the use of mixing blade 154 often results in the production of approxaimtely twice as much soap suds or foam than would be produced without its use.

Some of the surfactants already present in the wastewater are destroyed during the chemical oxidation reaction that takes place during the treatment process. These surfactants generally include anionic (negatively charged), cationic (positively charged), and non-ionic (neutral) surfactants. Anionic surfactants make up the majority of common soaps available on the market in developing countries. The two classes of anionic surfactants are linear and branched. Linear anionic surfactants are able to be broken down by biological means, but are more expensive to produce. Branched anionic surfactants are relatively difficult to break down, and are practically unaffected by biological treatment (e.g., by oxidation ponds or aerobic digestors), but are cheaper to produce, and thus, are used widely in developing countries. While biological treatment is not very effective in connection with branched anionic surfactants, ozone is relatively effective at breaking down these types of surfactants, and thus, is an effective treatment for the removal of these compounds as described herein.

Moreover, the reaction of ozone with the wastewater also produces new foaming agents via the chemical conversion of FOGs present in the wastewater into surface reactive components (e.g., active molecules or dipoles). In particular, at least some of the fats, oils, and/or greases already present in the wastewater are converted (or "reactivated") to active foaming agents by "attaching" oxygen molecules to "one end" of the long chain hydrocarbons, thereby creating polar molecules similar to fatty acids. As this mixture of small air and soap bubbles or suds rise from the bottom of flotation tank 146 to the surface, they carry with them any remaining insoluble FOGs and suspended solids (e.g., dirt particles, fecal matter, coffee grounds, lint, hair, and toilet paper), and form a thick layer of particulate-laden soap froth or foam that can then be vacuumed off (as explained below), thereby removing the above mentioned compounds from the processed wastewater. It should be noted that the formation of this ozone activated foam that rises to the surface of flotation tank 146 also assists in the adsorption and removal of unoxidized organics.

Although not shown, internal baffles, or plates that help to direct the flow of liquid can be used inside of flotation tank 146 in order to assist in the uniform dispersion of bubbles throughout the cell. These internal baffles can also be used to assist the movement of the foam in the direction of the vacuum head from where the foam will be vacuumed off (as explained below).

The particulate-laden foam then migrates to the narrow region of the flotation tank 146 (see FIG. 3 and the corresponding description below), which is designed to act as a slow zone for the ideal formation of foam. In particular, the wastewater below the layer of foam moves towards a weir (not shown) or "lip" located at the far end of the flotation tank 146 and into receiving bin 156, which is shown in more detail in FIG. 2 and is explained below. This wastewater is then discharged through outflow pipe or line 158 (assuming valve 160 is not closed) at a rate substantially equal to the rate of inflow of wastewater from reservoir 110. Upon discharge, the treated wastewater is, for example, put back into the environment.

A liquid/foam/solids mixture vacuum or suction line 162 exiting a soap cyclone device 166 is used to lift the particulate-laden foam layer away from the liquid spilling over the weir and into receiving bin 156 of flotation tank 146. Suction line 162 can be driven by a connection to a drive motor 170 for cyclone device 166. Alternatively, for example, suction line 162 can be driven by a blower (not shown) located on top of cyclone device 166, or by a connection (not shown) to induction nozzle 122. Although not shown, rather than vacuuming the foam away from flotation tank 146, for example, a scraper can be used, or a rotating disk method can be used where foam is scooped up as it passed by a removal point.

As the foam removed from the surface of flotation tank 146 enters the swirl chamber of cyclone device 166, it is reduced to a liquid, and a discharge line located at the bottom of the cyclone device 166 sends this liquid via pressure pump 174 to an optional back-flushing sand, mixed media, vacuum belt, or other suitable type of filter 178 to remove the disinfected, suspended solids. The discharge from filter 178 may be passed to an optional flash distillation unit 182 (or rather, for example, to a solar evaporator or other suitable component that can be used for liquid evaporation), which can be used for soap recovery, resulting in powdered soap discharge 186. Alternatively, for example, the discharge from filter 178 may be passed to a subterranean leech field for disposal.

According to various embodiments of the present invention, a flotation tank recycle line 190 is used to provide a longer duration of treatment for wastewater. In this case, both recycled wastewater from flotation tank 146 (assuming valve 117 is not closed) and untreated wastewater from reservoir 110 (assuming valve 116 is not closed) are pumped by pump 118 and passed through induction nozzle 122 and aeration tower 142 in a manner similar to that described above. As an example, flotation tank liquid can be recycled with incoming wastewater at a ratio of up to 2.5:1. While other ratios may also be used according to the invention (such as 1.5:1, or 5:1), it will be understood that, generally speaking, the energy costs associated with operating the treatment system shown in FIG. 1C will increase as this ratio increases.

Figure 2:
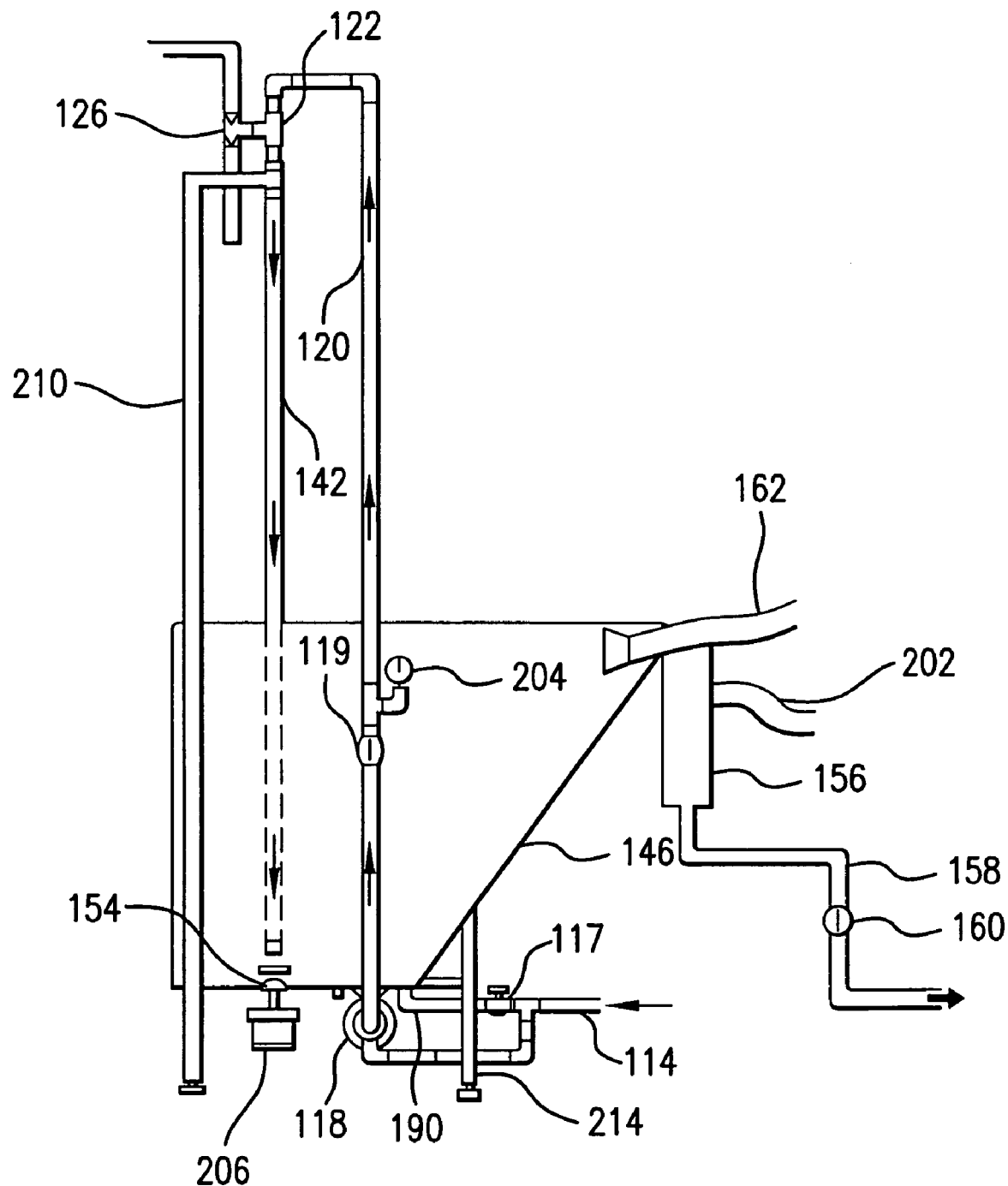
FIG. 2 is a simplified illustration showing a side view of a portion of the system shown in FIG. 1C.

FIG. 2 is a simplified illustration showing a side view of flotation tank 146 described above. According to various embodiments, receiving bin 156 can also have an opening in a side for an overflow line 202 to be used in case flotation tank 146 is not being drained fast enough using outflow line 158. Moreover, as shown, a pressure gauge 204 can be installed on line 120 to ensure that desired pressure characteristics are being satisfied, and motor 206 for driving mixing blade 154 can reside directly beneath the bottom of flotation tank 146. According to various embodiments of the invention (e.g., where flotation tank 146 is located below ground), mixing blade 154 may instead be shaft driven from the top of flotation tank 146. Moreover, as shown, flotation tank 146 and its associated components may be supported at least in part by adjustable supports, or legs 210 and 214.

Figure 3:
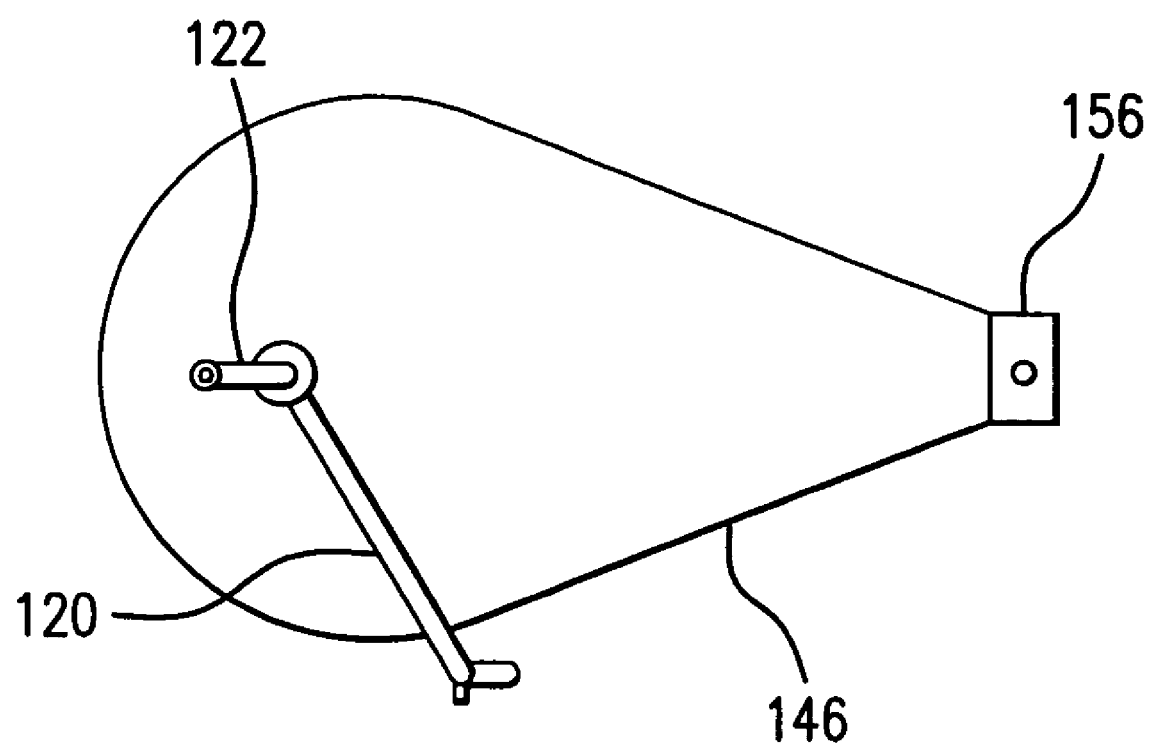
FIG. 3 is a simplified illustration showing a top view of a portion of the system shown in FIG. 1C.

FIG. 3 is a simplified illustration showing a top view of flotation tank 146 described above. As explained above, the narrowing of flotation tank 146 at one end facilitates the formation of foam. Nevertheless, it should be noted that the invention is not limited to the use of a tear-drop shaped flotation tank 146 as shown in FIG. 3.

Figure 4:
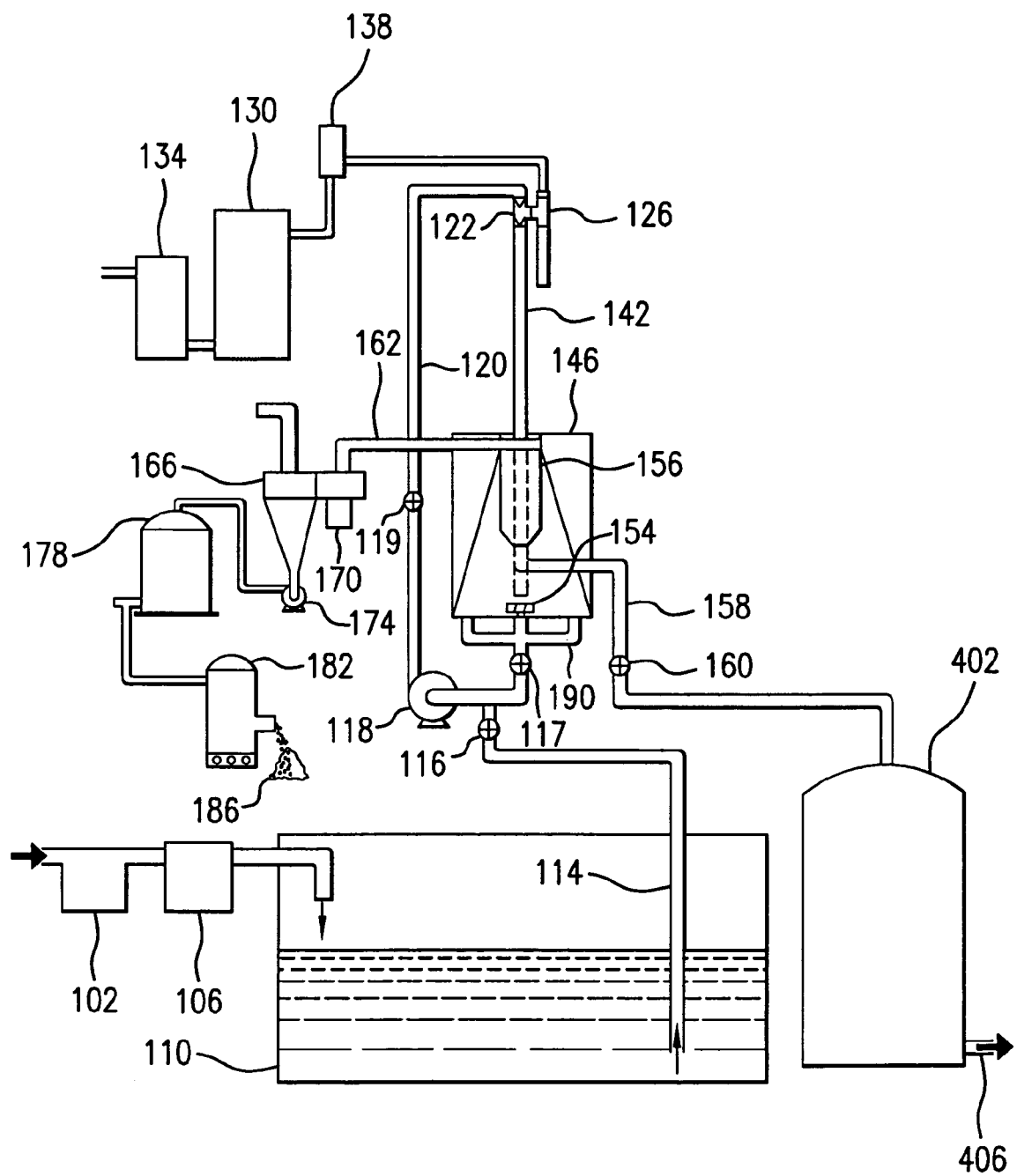
FIG. 4 is a simplified illustration showing a system that includes a flotation tank and an additional filtration unit for treating wastewater according to at least one embodiment of the present invention.

It should be noted that, according to various embodiments of the present invention, effluent exiting discharge line 158 is not immediately reintroduced into the environment. Rather, for example, as shown in FIG. 4, the treated wastewater being discharged through line 158 can be provided to a filter 402 for additional processing. For example, filter 402 can be a back-flushing sand, or a mixed media filter, although the invention is not limited in this manner.

According to various embodiments of the present invention, more than one flotation tank can be used together for the treatment of wastewater. For example, FIG. 5A shows an embodiment of the present invention similar to that shown in FIG. 1C, where two additional flotation tanks and associated components are used.

As explained above, wastewater that is treated using flotation tank 146 can be (though is not required to be) recycled and provided again, using recycle line 190, to flotation tank 146. After being re-circulated for a predetermined retention time, or after the initial treatment in flotation tank 146 (when wastewater is not recycled), wastewater exits flotation tank 146 though discharge line 158 at a flow rate substantially equal to the rate of inflow from reservoir 110 (as mentioned above). In the embodiment shown in FIG. 5A, instead of this effluent being introduced back into the environment, it is treated by a second flotation tank 502, where further treatment (e.g., removal of surfactants and suspended solids) of wastewater takes place.

Figure 5A:
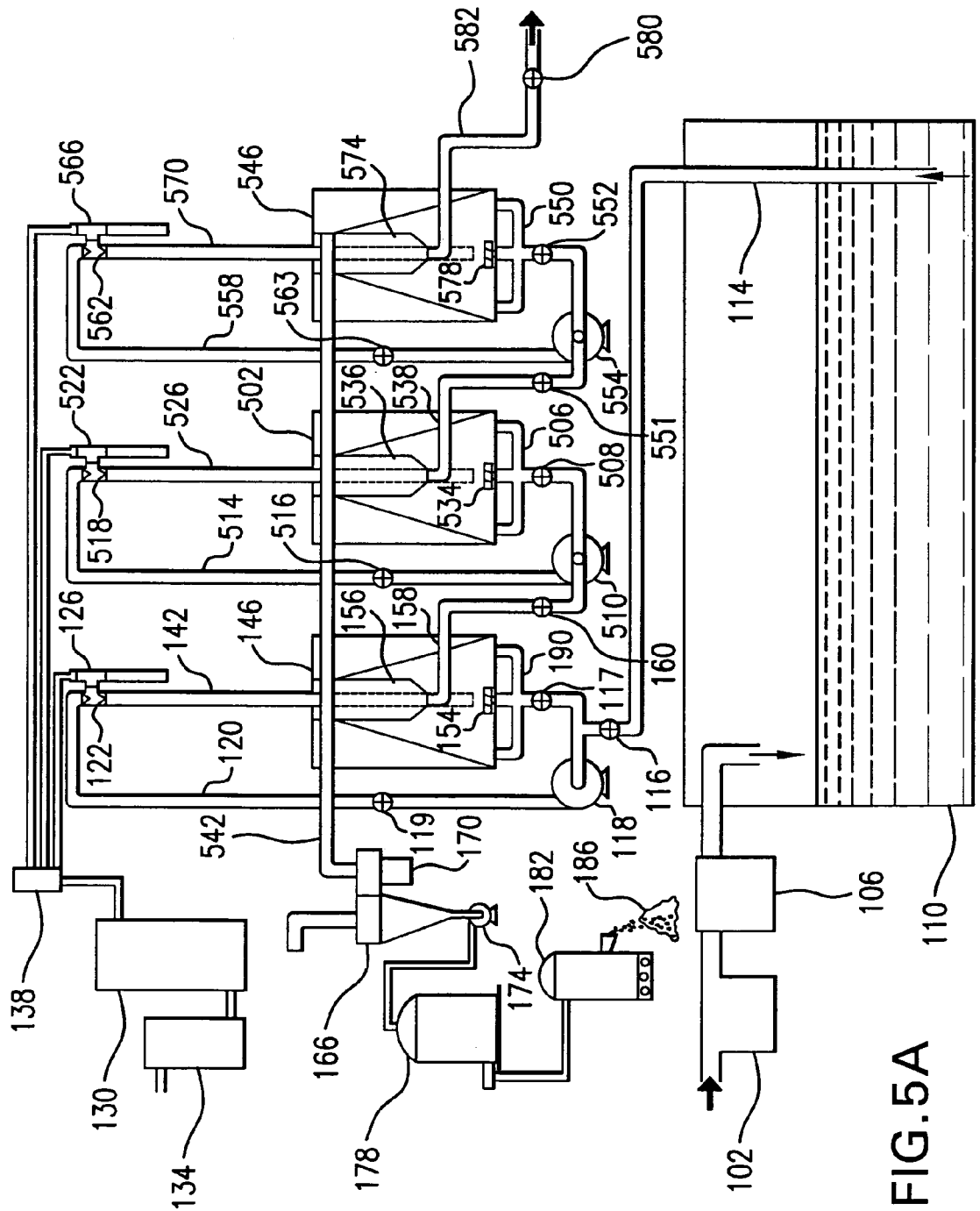
FIG. 5A is a simplified illustration showing a system that includes three flotation tanks for treating wastewater according to at least one embodiment of the present invention.
Figure 5B:
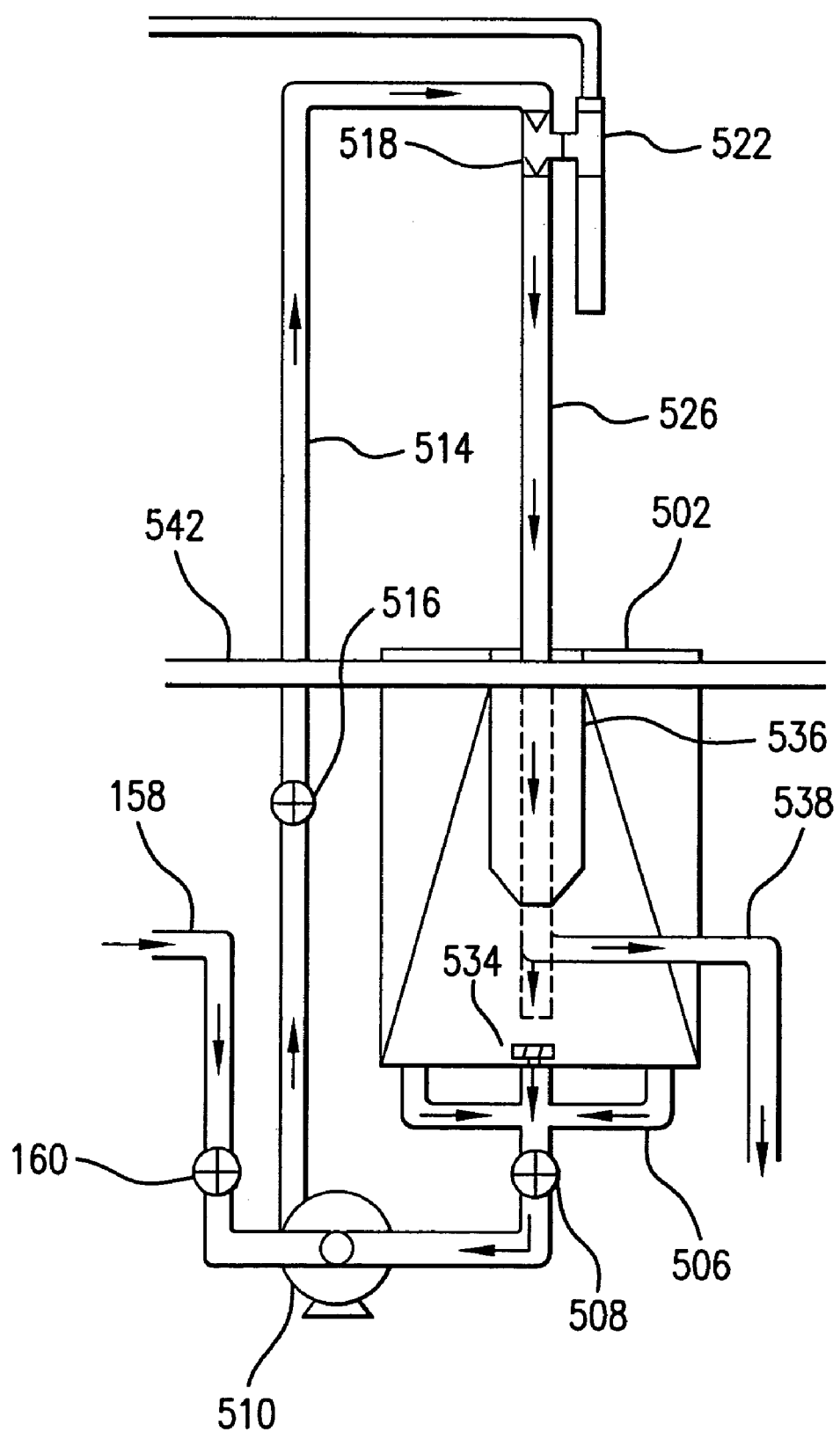
FIG. 5B is a magnified illustration showing a portion of the system shown in FIG. 5A.

As shown in FIG. 5B, which is a magnification of a portion of FIG. 5A with arrows showing the flow of wastewater, when valve 160 is open, the treated wastewater exiting receiving bin 156 (shown in FIG. 5A) through discharge line 158 is combined with wastewater exiting flotation tank 502 flowing through recycle line 506 (assuming valve 508 is open). Using pump 510, this combination of wastewater (or wastewater from line 158 only if valve 508 is closed) is provided through line 514 (assuming valve 516 is open) to induction nozzle 518. As with the example provided above, the ratio of recycled wastewater from flotation tank 502 to wastewater arriving from flotation tank 146 through line 158 can be up to 2.5:1. It will be understood that recycle line 506, pump 510, and induction nozzle 518, for example, may be similar or the same as recycle line 190, pump 118, and induction nozzle 122 described above with reference to FIG. 1C. Moreover, flotation tank 502 will generally hold approximately the same volume as flotation tank 146, although this is not required.

The wastewater being pumped by pump 510 passes induction nozzle 518, which, using air induction port 522, entrains ozone/air into the wastewater stream. The ozone/air infused, treated wastewater stream is received at the top of vertical aeration tower 526. The ozone/air saturated wastewater is discharged from the open end of tower 526 into the lower region of flotation tank 502, near the location of mixing blade 534, which is attached to a motor (not shown). As was the case with flotation tank 146, flotation tank 502 shown in FIGS. 5A and 5B also uses a receiving bin 536. It will be understood that induction port 522, aeration tower 526, blade 534, and receiving bin 536 are similar to, or the same as, the comparable components associated with flotation tank 146 described above with reference to FIG. 1C.

Referring back to FIG. 5A, a liquid/foam/solids mixture suction line 542 exiting cyclone device 166 is used to remove the resulting foam from flotation tank 502. It will be understood that suction line 542 may be similar to line 162 described above in connection with FIG. 1C, except that this line extends and removes foam from multiple flotation tanks rather than a single flotation tank.

As shown in FIG. 5A, the treatment of wastewater continues using a third flotation tank 546, which is also of approximately the same volume as flotation tank 146, and its associated components. In particular, the wastewater exiting receiving bin 536 though discharge line 538 (i.e., the wastewater of flotation tank 502 that is not being recycled via recycle line 506) is combined with wastewater exiting flotation tank 546 via recycle line 550 (assuming both valves 551-552 are open). In general, the flow rate of wastewater flowing away from flotation tank 502 via discharge line 538 is substantially equal to the inflow rate of wastewater from reservoir 110. Using pump 554, this combination is provided via line 558 to induction nozzle 562 (assuming valve 563 is open). Again, using the example provided above, the ratio of recycled wastewater from flotation tank 546 to wastewater arriving from flotation tank 502 through line 538 can be up to 2.5:1.

The combined wastewater passes induction nozzle 562, which, using air induction port 566, entrains ozone/air into the wastewater stream. The ozone/air infused, treated wastewater stream is received at the top of vertical aeration tower 570. The ozone/air saturated wastewater is discharged from the open end of tower 570 into the lower region of flotation tank 546, near the location of mixing blade 578, which is attached to a motor (not shown).

The liquid/foam/solids mixture suction line 542 exiting soap cyclone device 166 is used to remove the resulting foam from flotation tank 546. Finally, assuming valve 580 is open, wastewater exits receiving bin 581 (at a rate substantially equal to the rate of inflow from discharge line 538) though discharge line 582, for example, to be returned to the environment. Generally, if not already the case after the first or second stage of filtering using flotation tanks 146 and 502, respectively, at this point, COD/BOD is reduced to acceptable discharge standards. Moreover, in certain (but not all) situations, a substantial amount of foam will not accumulate in flotation tank 546 (due, e.g., to the prior removal of surfactants). In this case, for example, suction line 542 need not be extended to flotation tank 546 for foam removal.

It should be noted that, as with flotation tank 502 described above, recycle line 550, pump 554, nozzle 562, induction port 566, aeration tower 570, bin 574, and blade 578 can be similar (or the same as) the comparable components described above with reference to FIG. 1C.

Although FIG. 5A shows three flotation tanks 146, 502, and 546 and associated components being used to treat wastewater from reservoir 110, it will be understood that the invention is not limited in this manner. Rather, two, or more than three such flotation tanks and associated components may also be used without departing from the principles of the present invention. Moreover, it will be understood that different flow rates and different recycle rates may be used according to the invention in order to achieve a desired level of treatment for the wastewater (and using a desired level of energy consumption to achieve this treatment). For example, according to various embodiments, the flow rate of wastewater through suction line 114 may be such that it takes approximately forty minutes for each flotation tank 146, 502, and 546 to fill with wastewater (thus, two hours total for all three tanks 146, 502, and 546 to fill). After this point, wastewater will begin to overflow over the weirs (not shown) and into the respective receiving bins 156, 536, and 574. Once flotation tanks 146, 502, and 546 are full, the flow of wastewater is continuous (unless the flow rate of wastewater through suction line 114 is altered), and there is a theoretical two hour retention time of the wastewater in the treatment system shown in FIG. 5A (i.e., it takes approximately two hours for untreated wastewater from suction line 114 to exit through discharge line 582). In this case, according to various embodiments of the present invention, and using the treatment system shown in FIG. 5A, it is possible for a 75-90% reduction of suspended solids and a 60% reduction of the FOGs originally present in wastewater to be achieved within one hour of entering flotation tank 146, while up to 70% of the soaps are removed from the system within the two hour period.

Figure 6:
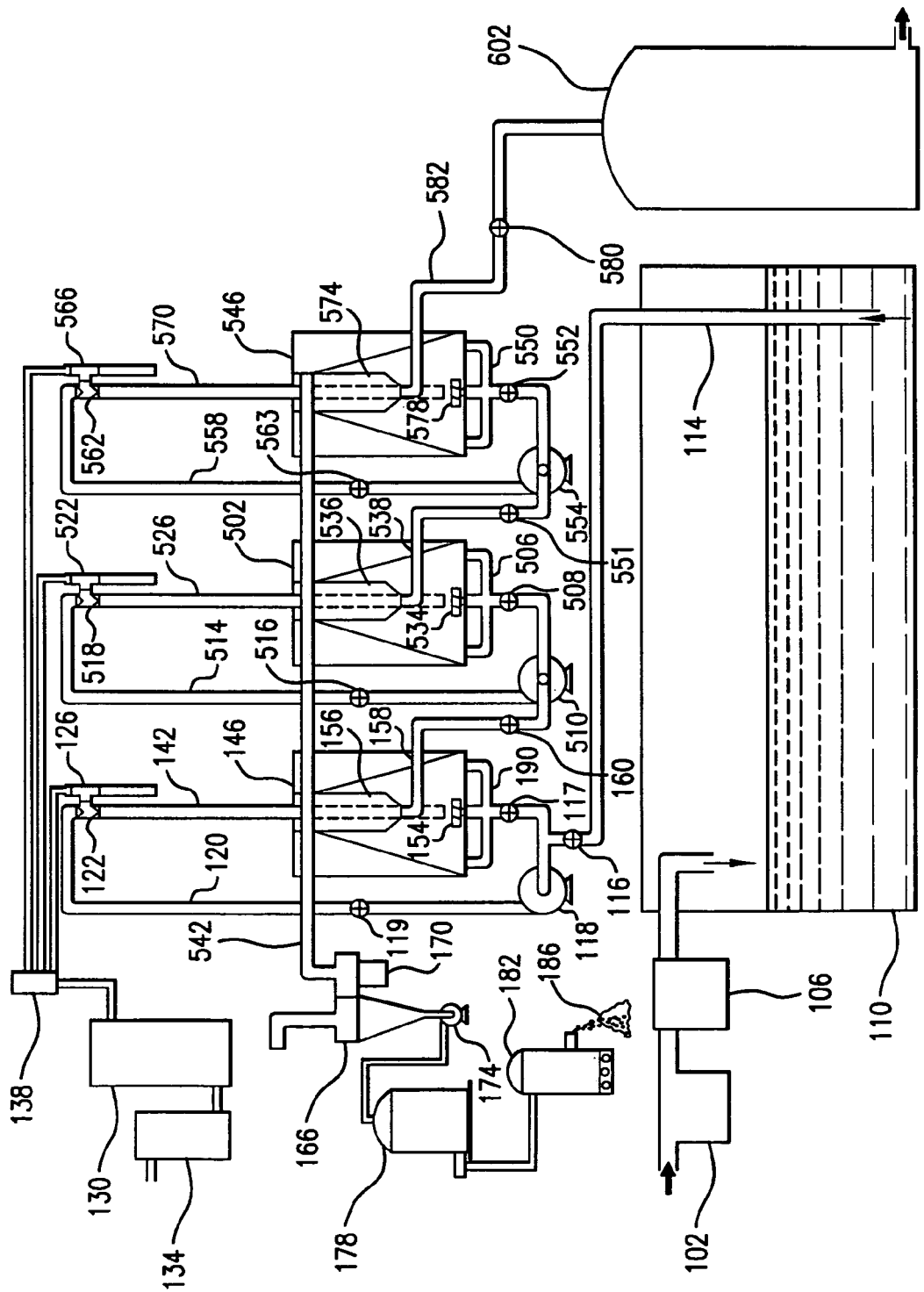
FIG. 6 is a simplified illustration showing a system that includes three flotation tanks and an additional filtration unit for treating wastewater according to at least one embodiment of the present invention.

It should also be noted that, according to various embodiments of the present invention, discharge line 582 may provide the treated wastewater to a filter. For example, as shown in FIG. 6, the treated effluent from flotation tank 546 can be provided to a filter 602 for further treatment. Filter 602 can be, for example, a back-flushing sand filter, a mixed media filter, or other suitable type of filter.

Figure 7A:
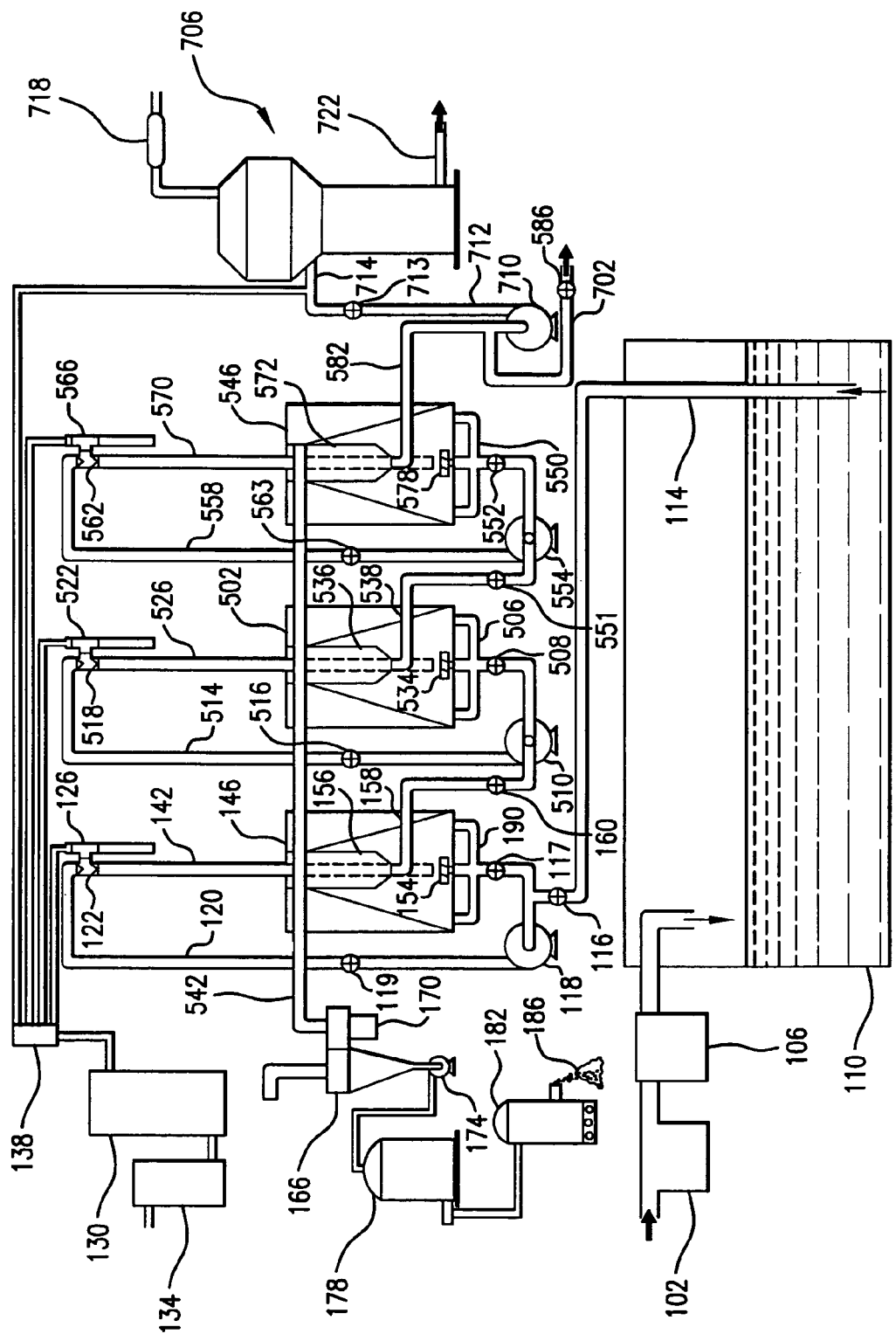
FIG. 7A is a simplified illustration showing a system that includes three flotation tanks and an ozone/UV reactor for treating wastewater according to at least one embodiment of the present invention.

According to other embodiments, such as the one shown in FIG. 7A, the treated effluent leaving flotation tank 546 though discharge line 582 can be provided to an ozone/UV reaction chamber that has been constructed in accordance with the principles of the present invention for further treatment.

In the embodiment of the invention shown in FIG. 7A, treated wastewater exiting through discharge line 582 can be routed through line 702 and discharged into the environment by opening valve 586. Alternatively, this wastewater can be further treated using ozone/UV reaction chamber or reactor 706 and its associated components (as described in greater detail below with reference to FIG. 8A). In particular, pressure pump 710 is used to draw from the flotation tank 546 and deliver treated wastewater, through line 712, to ozone/UV reactor 706 (when valve 713 is at least partially open). Ozone/ambient air induction nozzle 714, which can be similar in design to induction nozzles 122, 518, and 562 described above, entrains ozone gas into the previously treated wastewater prior to entering reactor 706. As shown in FIG. 7A, a commercially available optional ozone destruct unit 718 can be used, which generally includes UV light and an air filter and acts as a safety mechanism by controlling the release of residual ozone back into the environment. Finally, the treated wastewater is discharged into the environment via discharge line 722.

Figure 7B:
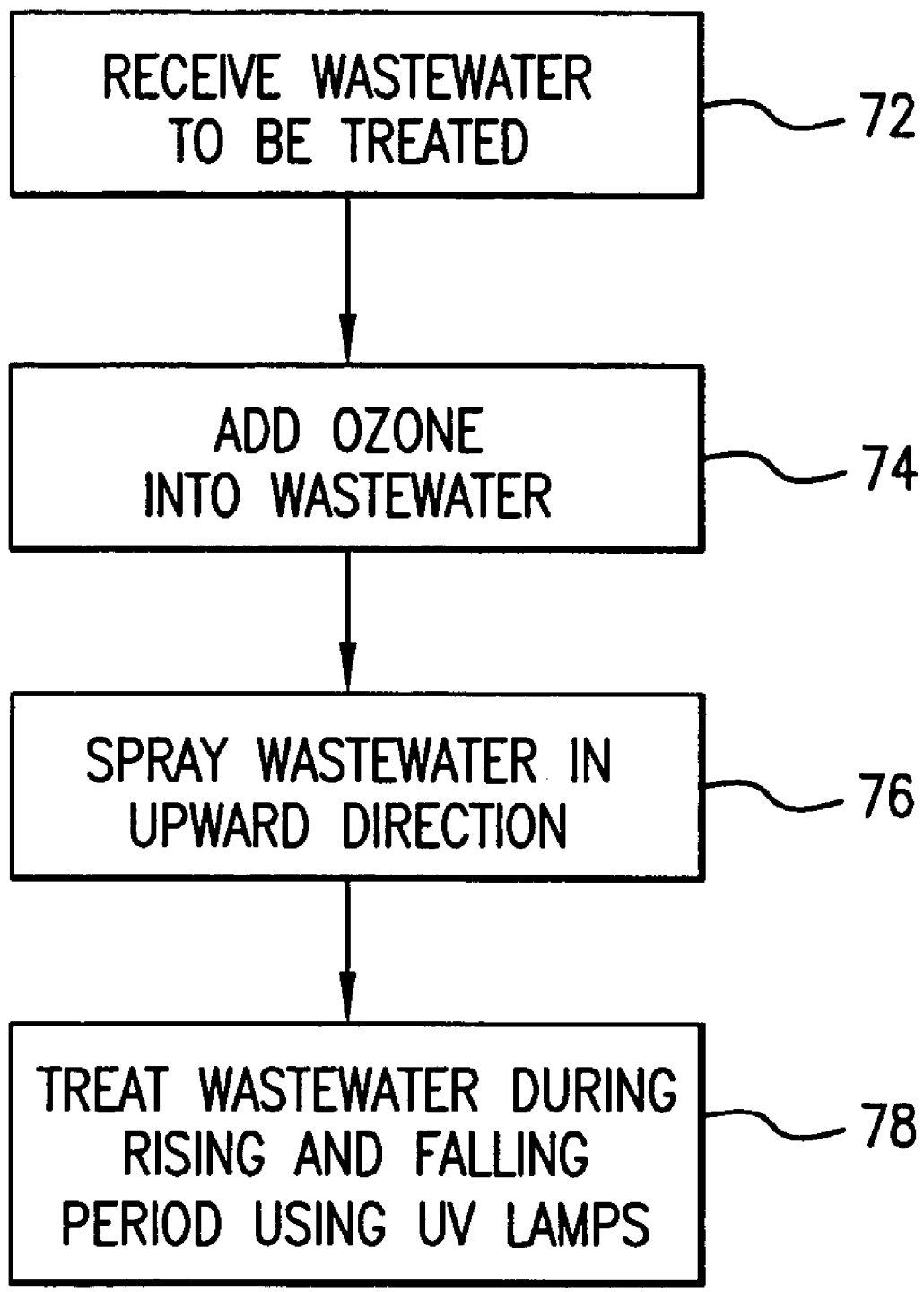
FIG. 7B is a simplified flow diagram illustrating steps performed in the treatment of wastewater using the ozone/UV reactor shown in FIG. 7A.

FIG. 7B is a simplified flow diagram illustrating steps performed in the treatment of wastewater using ozone/UV reactor 706 according to at least one embodiment of the present invention. At step 72, wastewater to be treated using ozone/UV reactor 706 is first received (e.g., from discharge line 582 associated with flotation tank 546). Next, at step 74, ozone (and optionally ambient air) is added (e.g., entrained) into the wastewater, whereby the resulting oxidation helps to purify the wastewater. Once inside ozone/UV reactor 706, at step 76, the wastewater is sprayed in an upward direction (using, e.g., a spray nozzle as described below). Finally, at step 78, the sprayed wastewater is treated using a plurality of UV lamps both while the sprayed wastewater is rising (against the force of gravity), and as the wastewater is on its way down into a collection portion of UV/reaction chamber 706. These and other steps will be better understood upon FIGS. 8A-8C, which are now explained in detail.

Figure 8A:
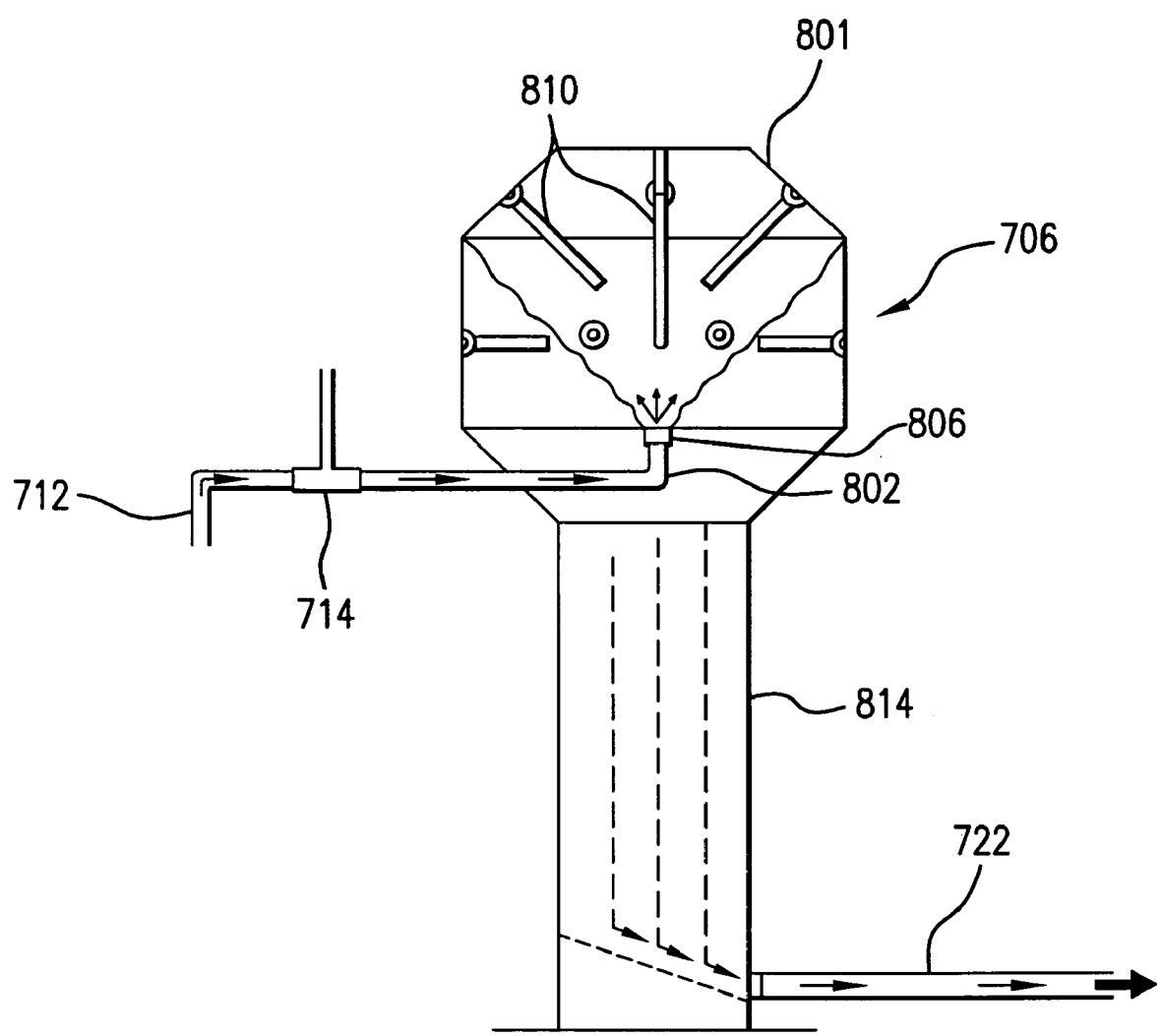
FIG. 8A is a more detailed, but still simplified illustration of the ozone/UV reactor shown in FIG. 7A.

FIG. 8A is a more detailed, but still simplified illustration showing a side view of ozone/UV reactor 706 (without ozone destruct unit 718). As shown, the discharge from induction nozzle 714 is plumbed through a sealed opening in a side wall of UV compartment 801, which generally operates under normal atmospheric conditions and ambient pressure. The pressurized feed line 802 carrying the ozone/air infused wastewater terminates in an upward directed atomizing nozzle or spray nozzle 806 in which the spray pattern and number of nozzles is dictated by the flow rate of the system. While an approximately 90° spray discharge is shown in FIG. 8A, it will be understood that the invention is not limited in this manner. For example, spray nozzle 806 may provide a spray discharge of between 60° and 120° (as determined by, e.g., the flow rate of the wastewater being provided to ozone/UV reactor 706). The particular discharge angle can be modified depending on the particular shape and/or size of UV compartment 801 to achieve optimal results. Moreover, although feed line 802 is plumbed through a side wall of UV compartment 801, it will be understood that the entry point may instead be from below compartment 801, for example.

Figure 8B:
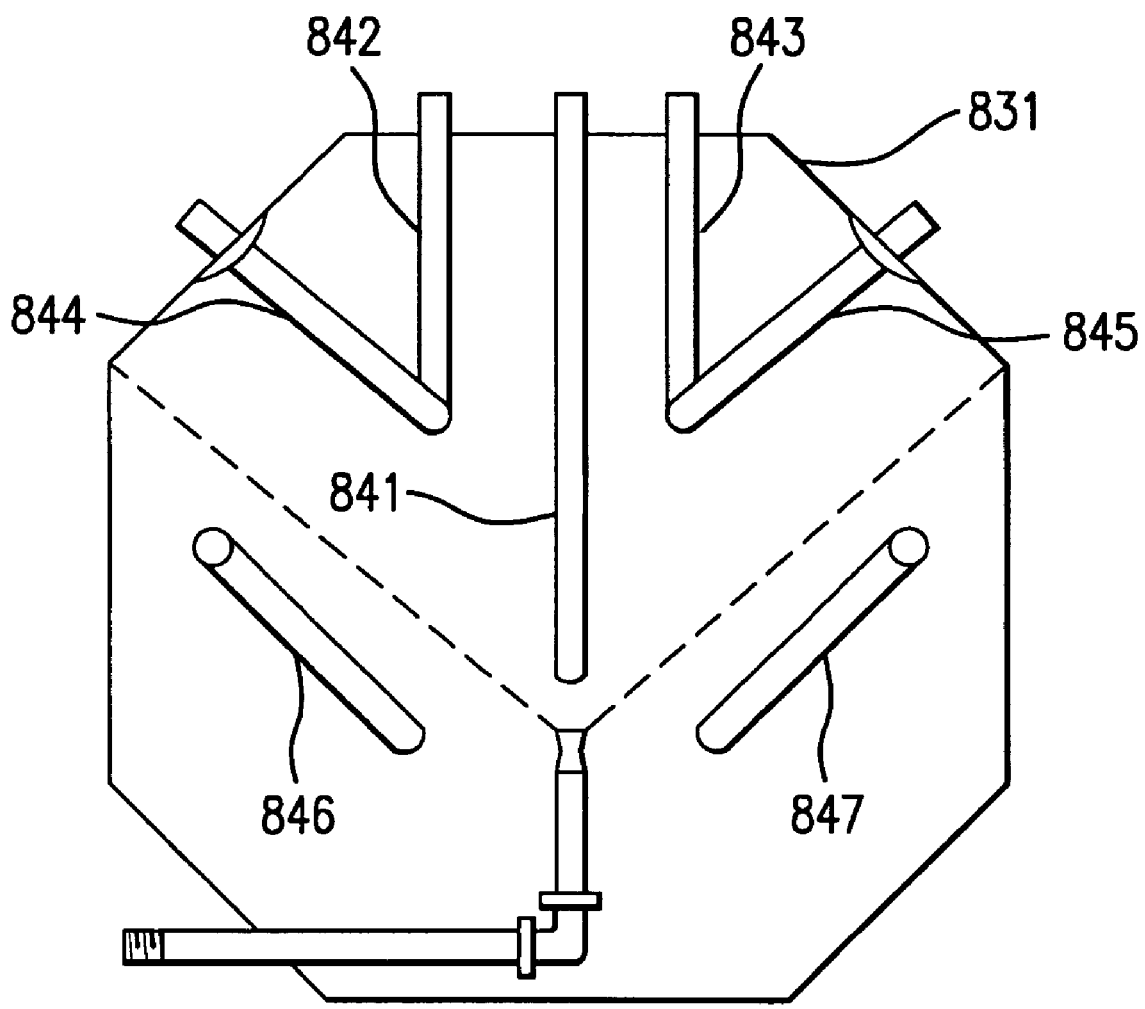
FIG. 8B shows a side view of a UV compartment according to at least one embodiment of the present invention.

The inverted reactor design allows for the ozone/air infused wastewater droplets or mist, generally ranging in size from 140-400 micrometers (depending on, for example, the shearing action of spray nozzle 806, which itself may have a larger opening of up to, for example, half an inch), to travel up through a series of low-pressure, germicidal, 254 nm UV lights or lamps 810 located both above and below the spray pattern discharge in UV compartment 801. According to various embodiments, these lamps 810 are 10-200 watt UV lamps. Although a particular placement of UV lamps 810 for the purpose of "submersing" them in the continuous spray of ozonated wastewater is shown in FIG. 8A, it will be understood that other placements are also contemplated. For example, FIG. 8B shows a side view of a UV compartment 831 that is similar to UV compartment 801 shown in FIG. 8A and described above, except that the placement of the UV lamps is different. In particular, UV compartment 831 of FIG. 8B includes thirteen strategically placed UV lamps, of which seven UV lamps 841-847 are shown. In general, the strategy involved in the placement of UV lamps inside UV compartments 801 and 831 will be at least in part based on the spray pattern discharge occurring therein.

Figure 8C:
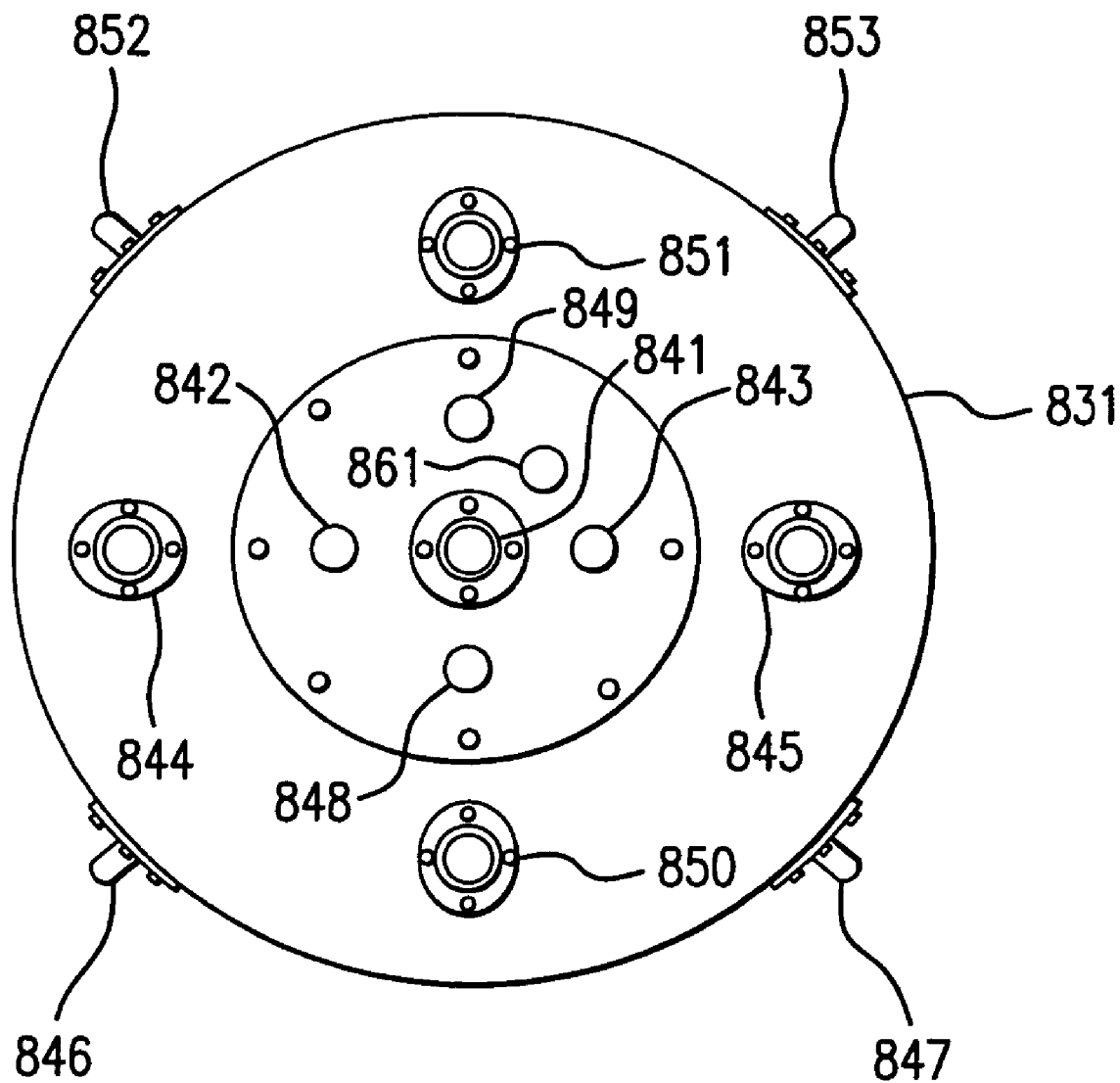
FIG. 8C shows a top view of the UV compartment shown in FIG. 8B.

FIG. 8C shows a top view of UV compartment 831, showing all thirteen UV lamps 841-853. As also shown in FIG. 8C, UV compartment 831 may include one or more openings 861 for the purpose of providing ventilation. According to various embodiments, both UV compartments 801 and 831 are fabricated using, e.g., stainless steel, where the interior of compartments 801 and 831 are polished to create a more mirror-like surface. In this manner, it is possible to increase the reflectance of 254 mm UV light from approximately 20-30% (as is common with normal stainless steel) to approximately 45-50%.

Although not shown in FIG. 8A, it should be noted that, according to various embodiments of the present invention, vent gases from inside UV compartment 801 may be recycled back to ozone/ambient air induction nozzle 714. In other words, one or more vent lines may be used to recycle residual ozone, oxygen, ambient air, and gases resulting from chemical oxidation back to ozone/ambient air induction nozzle 714 to be added (e.g., entrained) into the wastewater coming through line 712. This, in turn, assists with the atomization of the wastewater at spray nozzle 806. A similar vent line may also be used in connection with UV compartment 831 shown in FIGS. 8B-8C.

The placement of UV lamps such as shown in FIGS. 8A-8C allows close and constant contact with the ozone and the contaminants in the wastewater as it goes up and falls back down, essentially doubling exposure time between the ozone, UV light, and ozone/air infused wastewater droplets. This, in turn, increases the formation of OH— (hydroxyl) radicals inside the reaction chamber (because the 254 nm UV light causes ozone to disassociate), which are even more oxidative than ozone, while still allowing for a continuous process. According to various embodiments, in order to further increase the formation of OH— radicals, sodium hydroxide (NaOH) or calcium hydroxide (CaOH) is added at some point in the treatment process (e.g., in reservoir 110) to raise the pH of the wastewater to approximately 9.0. At this pH, precipitate formation during the treatment process is rapidly increased, as is the formation of OH— radicals. Thus, while most (or all) of the compounds in the wastewater that will react with ozone have already done so before reaching ozone/UV reactor 706, some of these compounds that are unreactive to ozone may be oxidized by exposure to larger amounts of OH— radicals.

During this oxidation process, at least some of the insoluble FOGs still present in the ozone/air infused wastewater is converted into a variety of soluble surfactants and wetting agents. Additionally, a large degree of bacterial disinfection, viral inactivation, and the lowering of COD/BOD also takes place through this oxidation process, in particular due to the contact of the wastewater with the OH— radicals. Moreover, the use of the ozone/UV reactor 706 alone can, in certain embodiments, reduce fecal coliform bacteria by over 99%.

The collection region 814 of ozone/UV reactor 706 serves as a collection tank for the treated wastewater. The newly treated wastewater falls down into collection region 814 where it collects. According to various embodiments, the wastewater is allowed to fill approximately the halfway level of collection region 814 before the wastewater is emptied through discharge line 722. This allows the treated wastewater to have additional contact time with any residual ozone gas in the solution that may still be present. Additionally, according to various embodiments, collection region 814 could include a filter. For example, collection region 814 could be packed with mixed media or granular activated carbon (GAC) similar to a rapid gravity filter, thereby converting collection region 814 into a trickle down filter. Similarly, biologically active carbon filtration can be used in collection region 814. The invention is not limited in this manner.

Figure 9:
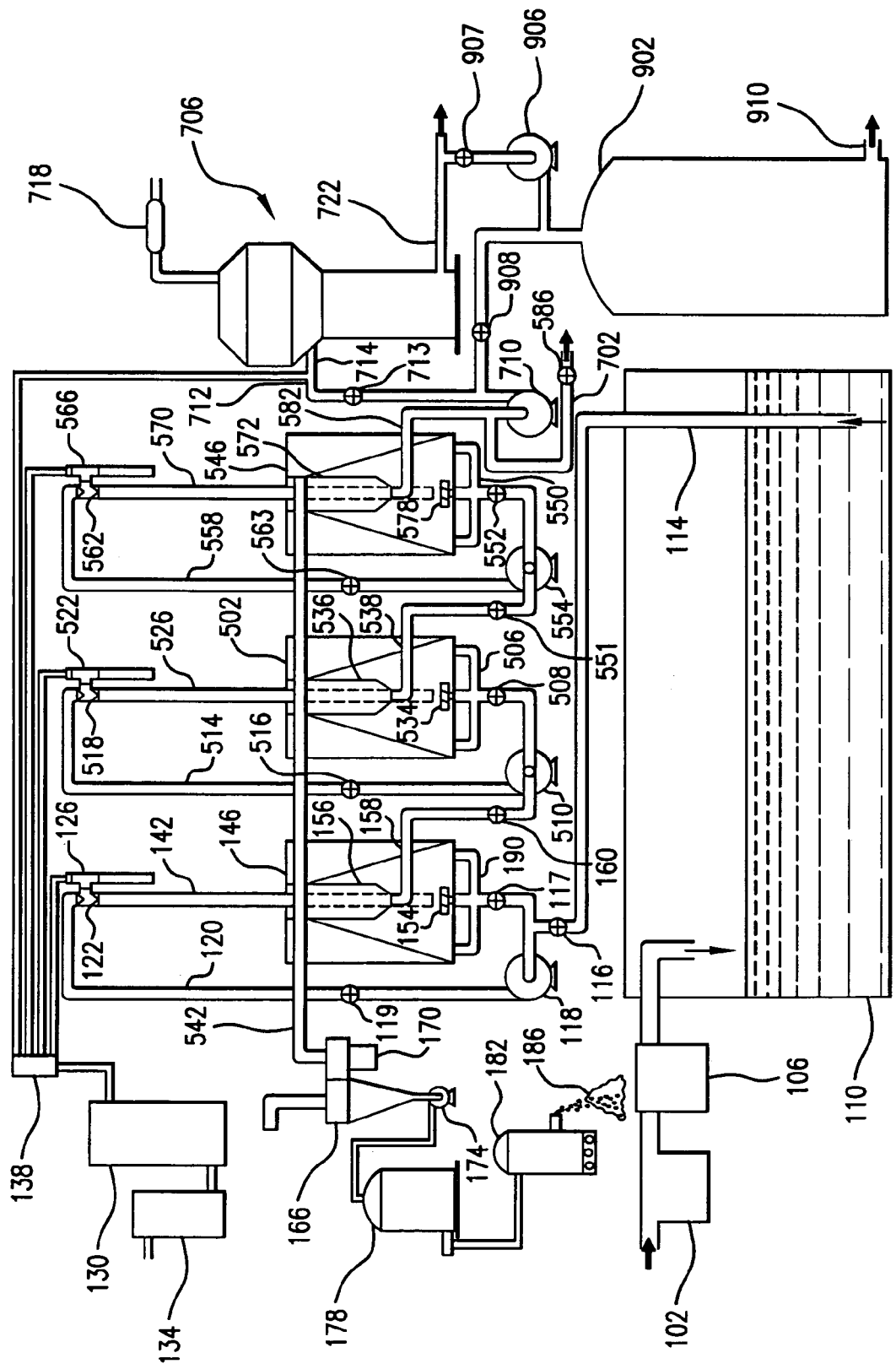
FIG. 9 is a simplified illustration showing a system that includes three flotation tanks, an ozone/UV reactor, and an additional filtration unit for treating wastewater according to at least one embodiment of the present invention.

According to various embodiments of the present invention, discharge line 722 provides the treated wastewater to another filtration unit. For example, as shown in FIG. 9, the treated effluent from ozone/UV reactor 706 can be provided to a back-flushing sand or mixed media filter 902 (or any other suitable type of filter) by pressure pump 906 for final polish filtration if required. In this case, valve 907 will be at least partially open. Moreover, as shown in FIG. 9, pressure pump 710 can deliver drawn wastewater exiting flotation tank 546 through discharge line 582 directly to filter 902. In this case, valve 908 is at least partially open, and the treated wastewater coming through discharge line 582 bypasses ozone/UV reactor 706.

As with the use of flotation tanks, it will be understood that the invention is not limited to the use of a single ozone/UV reactor. For example, FIG. 10 shows an embodiment of the present invention similar to that shown in FIG. 9, where an additional reactor 1002 (which can be similar in design to reactor 706 described above) and associated components are also used as part of the wastewater treatment process.

Figure 10:
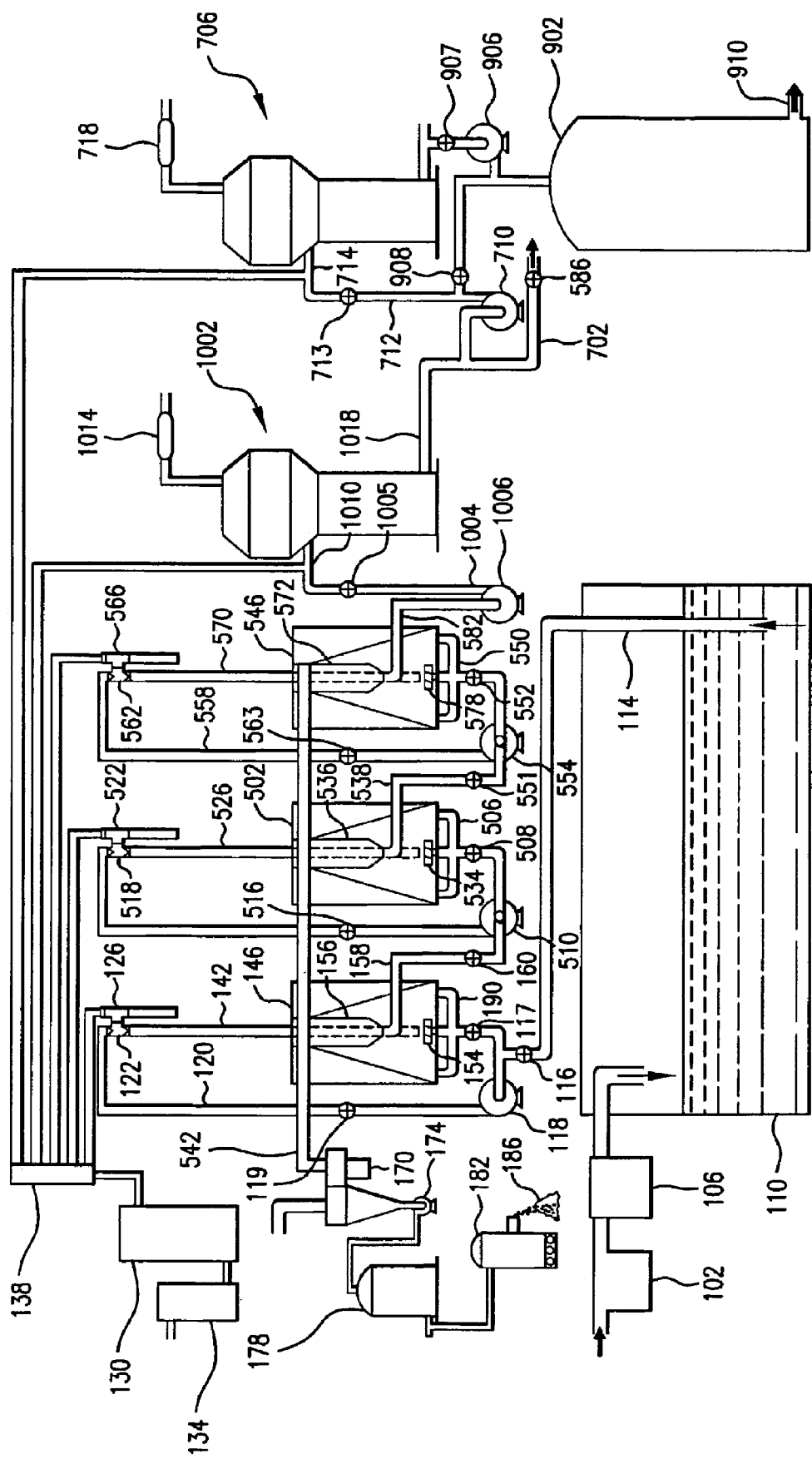
FIG. 10 is a simplified illustration showing a system that includes three flotation tanks, two ozone/UV reactors, and an additional filtration unit for treating wastewater according to at least one embodiment of the present invention.

As shown in FIG. 10, the wastewater exiting flotation tank 546 may be drawn by pump 1006 and provided through line 1004 (when valve 1005 is not closed) to induction nozzle 1010, and then to ozone/UV reactor 1002 for treatment. As with ozone/UV reactor 706, reactor 1002 can use an optional ozone destruct unit 1014 as a safety mechanism. The treated wastewater exiting ozone/UV reactor 1002 exits through line 1018, and using pump 710, is either discharged into the environment (when valve 586 is open), provided directly to filter 902 (when valve 908 is open), or provided to ozone/UV reactor 706 for further treatment (when valve 713 is open).

It should be noted that two ozone/UV reactors 706 and 1002 are shown in FIG. 10 for illustrative purposes only, and that the invention is not limited in this manner. Rather, more than two ozone/UV reactors can be used in series in accordance with various other embodiments of the present invention.

According to various embodiments and various types of wastewater, the treatment processes described above provide for the removal of 85-99% of suspended solids, 50-80% of surfactants, 50-70% of both COD and BOD, and up to 95% of FOGs. Greater removal rates are also contemplated according to various other embodiments of the present invention. Moreover, as mentioned above, for example, in the case of fecal coliform bacteria, disinfection rates approach 99%. Therefore, the benefits of using the principles of the present invention for the treatment of wastewater are clear.

Although the invention has been described and illustrated in the foregoing illustrative embodiments, it is understood that the present disclosure has been made only by way of example, and that numerous changes in the details of implementation of the invention can be made without departing from the spirit and scope of the invention. For example, although the treatment process described above with reference to, e.g., FIG. 7A includes the use of three flotation tanks 146, 502, and 546 followed by the use of a single ozone/UV reactor 706, the invention is not limited in this manner. According to various alternative embodiments of the present invention, ozone/UV reactor 706 will be a stand alone filtration system, and will thus receive wastewater directly from reservoir 110. Additionally, for example, ozone/UV reactor 706 can be used first in a treatment process, followed by treatment by one or more of flotation tanks 146, 502, and 546. Therefore, it will be understood that the particular order of treatment described above is not intended to be limiting.

Additionally, for example, although discharge line 722 of ozone/UV reactor 706 is shown in FIG. 8A as being situated 180% from the injection line 802, the invention is not limited in this manner. Rather, various design modifications are contemplated and considered to fall within the scope of the present invention. As another example, it is noted that, although a single cyclone device 166 is described above and shown in several figures in connection with the suctioning or vacuuming of foam from flotation tanks 146, 502, and 546, the invention is not limited in this manner. According to various embodiments of the present invention, one or more of these flotation tanks 146, 502, and 546 can use its own associated cyclone device, where the resulting liquids from the potentially multiple cyclone devices are combined and provided to a filter (such as filter 178 described above). Additionally, various other types of vacuum devices other than a cyclone may be used. For example, a sawdust and woodchip vacuum that has been modified for a "wet" application can be used. The invention is not limited in this manner.

Moreover, it should be noted that, while the addition of ozone into wastewater has been described above with reference primarily to an induction nozzle (e.g., a VENTURI nozzle) that entrains ozone into the wastewater, and which generally does not require added energy and is relatively efficient, the invention is not limited in this manner. For example, instead of using an induction nozzle for this purpose, it is possible to pump the ozone (and, according to various embodiments, also ambient air) into the wastewater using a pump, spray nozzle, bubble sparger (as often used in fish tanks), perforated plate, or in any other suitable manner.

The treatment methods and systems described herein are suitable for use in developing countries, and may be used to treat both raw or untreated wastewater (e.g., sewage), and previously treated effluent. Additionally, it will be understood that treatment of wastewater according to the principles of the present invention is applicable to a wide variety of other settings, including, but not limited to, treatment for a hotel, condominium complex, or a private luxury home community. Additionally, the treatment processes described above are contemplated for uses other than simply treatment of wastewater that is to be returned to the environment. For example, with the addition of fine filtration at the discharge end of these processes, the wastewater can often be reused for irrigation purposes. Moreover, it will be understood that the size of the various components described above can be varied in accordance with the particular need for treatment. For example, according to various embodiments, flotation tanks 146, 502, and 546 will be designed to treat up to 7,000 to 1.5 million gallons of wastewater per day. The addition of surfactants to the wastewater being treated by one or more flotation tanks is also contemplated for industrial applications where there is a large amount of suspended solids present. Moreover, while the use of 254 nm UV lamps is described above, it will be understood that UV light with other suitable wavelengths for disinfection and ozone "destruction" may also be used. In addition, other arrangements (and number) of UV lamps than those shown in FIGS. 8A-8C (e.g., where at least some UV lamps are located below spray nozzle 806) are contemplated. Thus, the invention is not limited in this manner.

Therefore, other embodiments, extensions, and modifications of the ideas presented above are comprehended and should be within the reach of one practicing in the art upon reviewing the present disclosure. Accordingly, the scope of the present invention in its various aspects should not be limited by the examples presented above. The individual aspects of the present invention, and the entirety of the invention should be regarded so as to allow for such design modifications and future developments within the scope of the present disclosure. The present invention is limited only by the claims which follow.

What is claimed is:

1. A method for treating wastewater comprising:
   receiving wastewater to be treated;
   adding ozone into the wastewater;
   agitating the wastewater to facilitate the formation of foam;

removing at least some of the foam from the wastewater, wherein the removing the foam from the wastewater comprises suctioning out the foam to be removed through a suction line;

providing the foam removed through the suction line to a cyclone device, wherein the cyclone device reduces the foam to a liquid; and providing the foam that has been reduced to a liquid to a flash distillation unit for soap recovery.

2. The method of claim 1, further comprising passing the wastewater through at least one of a grinder, a solids separator, a grip removal trap, and an auger tray prior to the passing of the wastewater through a first induction nozzle.

3. The method of claim 1, wherein adding ozone into the wastewater comprises passing the wastewater through a first induction nozzle that is used to entrain the ozone into the wastewater.

4. The method of claim 3, wherein the first induction nozzle comprises a drive tube into which the wastewater enters, a tube out of which the wastewater exits, and a tee having a body portion that connects the drive tube and the exit tube.

5. The method of claim 4, wherein the diameter of the exit tube orifice is 1.4-1.8 times larger than the diameter of the drive tube discharge orifice.

6. The method of claim 1, wherein the ozone that is added into the wastewater is received from an ozone generator that uses at least one of ambient air and pure oxygen to produce ozone gas in concentrations of up to approximately 12%.

7. The method of claim 1, wherein the foam is formed as a result of the conversion of at least some surfactants (soaps), fats, oils, and/or greases present in the wastewater into active foaming agents.

8. The method of claim 1, wherein the agitating the wastewater to facilitate the formation of foam comprises impacting the wastewater against a rotating mixing blade.

9. The method of claim 8, wherein the rotating mixing blade comprises a plurality of pitched bladed units that are configured to create a downdraft effect on the wastewater that impacts the mixing blade.

10. The method of claim 8, wherein the agitating the wastewater to facilitate the formation of foam further comprises passing the wastewater through an aeration tower.

11. The method of claim 8, wherein the agitating the wastewater to facilitate the formation of foam takes place inside of a flotation tank, and wherein the rotating mixing blade is located substantially at the bottom of the flotation tank.

12. The method of claim 11, wherein the foam rises towards the top of the flotation tank, and carries with it at least some of the fats, oils, greases and/or other suspended solids present in the wastewater.

13. The method of claim 11, wherein the flotation tank comprises a region that is narrow relative to the remainder of the flotation tank, and wherein a substantial portion of the foam moves to the narrow portion of the flotation tank.

14. The method of claim 1, further comprising:
adding additional ozone into the wastewater remaining after the removal of the foam;
spraying the wastewater in an upward direction against the force of gravity; and
treating the sprayed wastewater with ultraviolet light both as it moves in the upward direction and after the wastewater begins to fall back down.

15. The method of claim 1, further comprising adding at least one of sodium hydroxide (NaOH) and calcium hydroxide (CaOH) to the wastewater in order to increase the pH of the waste water to approximately 9.0.

16. The method of claim 1, further comprising: passing at least a portion of the wastewater remaining after the removal of the foam through the first
induction nozzle, wherein the first induction nozzle is used to further entrain ozone into the wastewater;
re-agitating the portion of the wastewater having twice passed through a first induction nozzle to facilitate the formation of additional foam;
and removing at least some of the additional foam from the wastewater.

17. The method of claim 1, wherein adding ozone into the wastewater comprises passing the wastewater through a first induction nozzle that is used to entrain ozone into the wastewater and the method further comprising:
passing at least a portion of the wastewater remaining after the removal of the foam through a second induction nozzle, wherein the second induction nozzle is used to entrain ozone into the wastewater;
agitating the portion of the wastewater having passed through the second induction nozzle to facilitate the formation of additional foam; and
removing at least some of the additional foam from the wastewater.

18. The method of claim 1, further comprising discharging the wastewater remaining after the removal of the foam to a filter for additional treatment.

* * * * *